(12) United States Patent
Kim et al.

(10) Patent No.: US 9,965,859 B2
(45) Date of Patent: May 8, 2018

(54) METHOD AND APPARATUS FOR DETERMINING REGION OF INTEREST OF IMAGE

(71) Applicant: Samsung Electronics Co., Ltd., Gyeonggi-do (KR)

(72) Inventors: Geon-Soo Kim, Gyeonggi-do (KR); Dong-Hyun Yeom, Gyeonggi-do (KR); Yong-Joon Jeon, Gyeonggi-do (KR); Min-Kyung Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 14/961,407

(22) Filed: Dec. 7, 2015

(65) Prior Publication Data

US 2016/0163036 A1 Jun. 9, 2016

(30) Foreign Application Priority Data

Dec. 5, 2014 (KR) ........................ 10-2014-0174232

(51) Int. Cl.
| | | |
|---|---|---|
| *G06T 7/00* | (2017.01) | |
| *G06K 9/00* | (2006.01) | |
| *G06K 9/32* | (2006.01) | |
| *G06T 7/70* | (2017.01) | |
| *G06T 7/246* | (2017.01) | |

(52) U.S. Cl.
CPC .............. *G06T 7/004* (2013.01); *G06K 9/00* (2013.01); *G06K 9/00342* (2013.01); *G06K 9/3233* (2013.01); *G06T 7/248* (2017.01); *G06T 7/70* (2017.01); *G06T 2207/10016* (2013.01); *G06T 2207/30196* (2013.01)

(58) Field of Classification Search
CPC . G06T 7/70; G06T 7/248; G06T 2207/10016; G06T 2207/30196; G06K 9/00
See application file for complete search history.

(56) References Cited

U.S. PATENT DOCUMENTS

| | | | |
|---|---|---|---|
| 6,577,238 B1 * | 6/2003 | Whitesmith | G01S 13/878 340/10.1 |
| 6,774,885 B1 * | 8/2004 | Even-Zohar | A61B 5/1036 345/156 |

(Continued)

FOREIGN PATENT DOCUMENTS

JP 2014081788 5/2014

OTHER PUBLICATIONS

Gjoreski, "Adaptive human activity recognition and fall detection using wearable sensors," Masters Thesis, Jožef Stefan International Postgraduate School, Ljubljana, Slovenia, Aug. 2011.*

(Continued)

*Primary Examiner* — Matthew Bella
*Assistant Examiner* — Soo Shin
(74) *Attorney, Agent, or Firm* — The Farrell Law Firm, P.C.

(57) ABSTRACT

Disclosed is a method for determining a region of interest (ROI) from an image. The method includes obtaining a wearing portion of a first electronic device, obtaining a first image related to a user wearing the first electronic device, and determining the ROI from the first image based on the obtained wearing portion.

18 Claims, 28 Drawing Sheets

(56) References Cited

U.S. PATENT DOCUMENTS

| | | | | |
|---|---|---|---|---|
| 6,803,945 | B1* | 10/2004 | Needham | G08B 13/19602 348/155 |
| 8,179,604 | B1* | 5/2012 | Prada Gomez | G02B 27/0093 345/8 |
| 8,226,494 | B2* | 7/2012 | Miettinen | A63B 69/3608 473/212 |
| 8,622,832 | B2* | 1/2014 | Marty | A63B 24/0003 463/36 |
| 9,358,455 | B2* | 6/2016 | Marty | G06K 9/00342 |
| 2004/0028137 | A1* | 2/2004 | Wyn-Harris | G08B 13/1961 375/240.17 |
| 2005/0013467 | A1* | 1/2005 | McNitt | A63B 24/0003 382/107 |
| 2006/0133648 | A1* | 6/2006 | Meunier | H04B 10/1149 382/103 |
| 2008/0297304 | A1* | 12/2008 | Moscovitch | H04N 7/181 340/3.1 |
| 2009/0116692 | A1* | 5/2009 | Paul | G06F 3/017 382/103 |
| 2010/0103075 | A1* | 4/2010 | Kalaboukis | A63F 13/02 345/8 |
| 2015/0331598 | A1* | 11/2015 | Kang | G06F 3/011 715/765 |
| 2016/0026853 | A1* | 1/2016 | Wexler | H04N 5/2257 382/103 |

OTHER PUBLICATIONS

Kemp, "A wearable system that learns a kinematic model and finds structure in everyday manipulation by using absolute orientation sensors and a camera," PhD Dissertation, Massachusetts Institute of Technology, Jun. 2005.*

Comaniciu et al., "Kernel-Based Object Tracking," IEEE Transactions on Pattern Analysis and Machine Intelligence, vol. 25, No. 5, May 2003.*

* cited by examiner

METHOD AND APPARATUS FOR DETERMINING REGION OF INTEREST OF IMAGE

PRIORITY

This application claims the priority under 35 U.S.C. § 119(a) to a Korean patent application filed in the Korean Intellectual Property Office on Dec. 5, 2014 and assigned Serial No. 10-2014-0174232, the entire disclosure of which is incorporated herein by reference.

BACKGROUND OF THE INVENTION

1. Field of the Invention

The present invention relates to methods and apparatuses for determining a region-of-interest of an image, and more specifically, to methods and apparatuses for determining a region of interest for image-processing.

2. Description of the Related Art

Electronic devices processing obtained images and executing applications using the result of the processing are recently proliferating. For example, conventional electronic devices include a camera module capable of capturing front-view images. An electronic device detects a particular object from a front-view image and executes an augmented reality application providing additional information regarding the detected object. The augmented reality application processes an obtained image and detects a particular object. The augmented reality application processes the entire image area of the obtained image and detects the particular object based on a result of the processing.

Another conventional electronic device obtains an image including at least a portion of a user's body. The conventional electronic device consecutively captures a user's behaviors and determines the user's behaviors using the obtained multiple images. The electronic device processes the entire area of the obtained image and determines the user's behaviors based on the result of the processing.

As described above, conventional electronic devices process the entire image area and thus suffer from an increase in the amount of required computation. This becomes a more significant detriment in electronic devices with limited Central Processing Unit (CPU) or Random Access Memory (RAM) resources, such as mobile electronic devices.

Conventional electronic devices allocate restricted resources to real-time image processing and analysis of processed results. As a result of this allocation, the electronic devices incur reduced resources to allocate to the analysis of processed results, thus rendering it difficult to precisely interpret the processed results.

SUMMARY OF THE INVENTION

The present invention has been made to address the above-mentioned problems and disadvantages, and to provide at least the advantages described below.

Accordingly, an aspect of the present invention is to provide methods and apparatuses for determining a region-of-interest to improve the process of image processing.

According to an aspect of the present invention, a method for determining a Region Of Interest (ROI) includes obtaining a wearing portion of a first electronic device, obtaining a first image related to a user wearing the first electronic device, and determining the ROI from the first image based on the obtained wearing portion.

According to another aspect of the present invention, an ROI determining apparatus includes an image-obtaining module that obtains a first image related to a user wearing a first electronic device, and a processing module that obtains a wearing portion of the first electronic device and determines the ROI from the first image based on the obtained wearing portion.

According to another aspect of the present invention, an ROI determining method includes obtaining a first image related to a user wearing at least one electronic device, obtaining a wearing portion of each of the at least one electronic device, and determining the ROI of the first image using a wearing portion of a first electronic device from which a motion has been detected among the at least one electronic device.

According to another aspect of the present invention, an ROI determining method includes executing a first application using a result of image-processing, obtaining a first image related to a user, and determining the ROI from the first image based on a type of the first application.

According to another aspect of the present invention, an ROI-determining method includes obtaining sensed data from a first electronic device, obtaining an image for a user wearing the first electronic device, and determining the ROI from the image based on the obtained sensed data.

Other aspects, advantages, and salient features of the disclosure will become apparent to those skilled in the art from the following detailed description, which, taken in conjunction with the annexed drawings, discloses embodiments of the present invention.

BRIEF DESCRIPTION OF THE DRAWINGS

The above and other aspects, features, and advantages of the present invention will be more apparent from the following detailed description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

Figure 1:
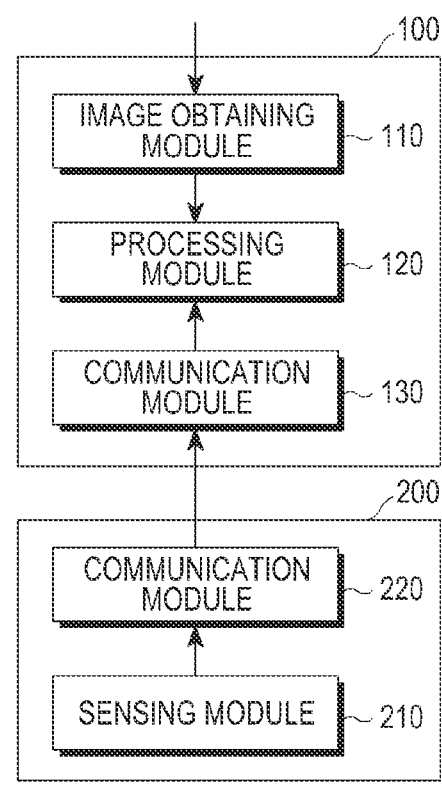
FIG. 1 is a block diagram illustrating a device for determining an ROI and a wearable electronic device according to an embodiment of the present invention.

Hereinafter, embodiments of the present invention are described with reference to the accompanying drawings. However, it should be appreciated that the present invention is not limited to the embodiments, and all changes and/or equivalents or replacements thereto also belong to the scope of the present invention. The same or similar reference denotations may be used to refer to the same or similar elements throughout the specification and the drawings. In addition, descriptions of well-known functions and constructions are omitted for clarity and conciseness.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be referred to as a second component, and vice versa without departing from the scope of the present invention.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not necessarily indicate "specifically designed in hardware to." Rather, the term "configured to" indicates that a device can perform an operation together with another device or parts. For example, the term "processor configured (or set) to perform A, B, and C" indicates a generic-purpose processor (e.g., a CPU or application processor) that performs the operations by executing one or more software programs stored in a memory device or a dedicated processor (e.g., an embedded processor) for performing the operations.

The terms as used herein are provided merely to describe some embodiments thereof, but not to limit the scope of other embodiments of the present invention. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present invention.

For example, examples of the electronic device according to embodiments of the present invention include at least one of a smartphone, a tablet Personal Computer (PC), a mobile phone, a video phone, an e-book reader, a desktop PC, a laptop computer, a netbook computer, a workstation, a Personal Digital Assistant (PDA), a Portable Multimedia Player (PMP), an MP3 player, a mobile medical device, a camera, or a wearable device, such as smart glasses or a Head-Mounted Device (HMD), electronic clothes, an electronic bracelet, an electronic necklace, an electronic appcessory, an electronic tattoo, a smart mirror, or a smart watch.

According to an embodiment of the present invention, the electronic device may be a smart home appliance including at least one of a television, a Digital Video Disk (DVD) player, an audio player, a refrigerator, an air conditioner, a cleaner, an oven, a microwave oven, a washer, a dryer, an air cleaner, a set-top box, a home automation control panel, a security control panel, a TV box, such as Samsung HomeSync™, Apple TV™, or Google TV™, a gaming console such as Xbox™ or PlayStation™, an electronic dictionary, an electronic key, a camcorder, or an electronic picture frame.

According to an embodiment of the present invention, examples of the electronic device include at least one of various medical devices, such as a blood sugar measuring device, a heartbeat measuring device, or a body temperature measuring device, a Magnetic Resonance Angiography (MRA) device, a Magnetic Resonance Imaging (MRI) device, a Computed Tomography (CT) device, an imaging device, or an ultrasonic device, a navigation device, a Global Positioning System (GPS) receiver, an Event Data Recorder (EDR), a Flight Data Recorder (FDR), an automotive infotainment device, an sailing electronic device, such as a sailing navigation device or a gyro compass, avionics, security devices, vehicular head units, industrial or home robots, Automatic Teller Machines (ATMs), Point Of Sales (POS) devices, or Internet of Things devices, such as a bulb, various sensors, an electric or gas meter, a sprinkler, a fire alarm, a thermostat, a street light, a toaster, fitness equipment, a hot water tank, a heater, or a boiler.

According to various embodiments of the present invention, examples of the electronic device may at least one of furniture, part of a building/structure, an electronic board, an electronic signature receiving device, a projector, or various measurement devices such as for measuring water, electricity, gas, or electromagnetic waves. According to an embodiment of the present invention, the electronic device may be one or a combination of the above-listed devices, may be a flexible electronic device, and may include new electronic devices depending on the evolution of technology.

As used herein, the term "user" may denote a human or another device, such as an artificial intelligent electronic device using the electronic device.

FIG. 1 is a block diagram illustrating a device for determining an ROI and a wearable electronic device according to an embodiment of the present invention.

As shown in FIG. 1, the ROI-determining apparatus 100 includes an image-obtaining module 110, a processing module 120, and a communication module 130. The wearable electronic device 200 includes a sensing module 210 and a communication module 220.

The image-obtaining module 110, the processing module 120, and the communication module 130 included in the ROI-determining apparatus 100 may be connected with one another via a bus. The bus includes a circuit for transferring communications between the components.

The image-obtaining module 110 obtains an image related to a user wearing the wearable electronic device 200. For example, the user may put the wearable electronic device 200 on a first wearing portion. The image-obtaining module 110 obtains an image for at least a portion of the body of the user wearing the wearable electronic device 200 on the first wearing portion.

For example, the image-obtaining module 110 may be a device for capturing still images and videos, and includes, according to an embodiment of the present invention, one or more image sensors, a lens, an Image Signal Processor (ISP), or a flash such as an LED or xenon lamp. Alternatively, the image-obtaining module 110 may be implemented as an interface that is connected to a camera module including an image sensor to receive data for an image from the camera module. That is, another electronic device including a camera module may be connected to the ROI-determining apparatus 100, and the image-obtaining module 110 obtains an image from the other electronic device. According to an embodiment of the present invention, an electronic device, such as a TV, displaying results of processing an ROI, other than the ROI-determining apparatus 100 and the other electronic device including a camera module, may be separately implemented.

The processing module 120 obtains the first wearing portion of the wearable electronic device 200. According to an embodiment of the present invention, the processing module 120 obtains association information on the wearable electronic device 200 and the first wearing portion corresponding to the wearable electronic device 200. The processing module 120 determines the first wearing portion based on the obtained association information. For example, the association information includes information indicating that the wearable electronic device 200 is placed on the user's wrist. The processing module 120 identifies that the first wearing device is the wrist using the obtained association information.

According to an embodiment of the present invention, the processing module 120 obtains the first wearing portion based on wearing portion information or data sensed by the wearable electronic device 200. For example, the communication module 130 obtains the sensed data from the communication module 220 of the wearable electronic device 200. The sensing module 210 senses a motion or bio information of the user wearing the device. The communication module 220 receives sensed data from the sensing module 210 and transmits the sensed data to the communication module 130 of the ROI-determining apparatus 100. For example, a processing module of the wearable electronic device 200 receives sensed data from the sensing module 210 and transfers the received sensed data to the communication module 220. The processing module 120 obtains the first wearing portion of the wearable electronic device 200 based on the obtained sensed data. Alternatively, the processing module of the wearable electronic device 200 determines the first wearing portion based on the sensed data. The communication module 220 transmits the determined first wearing portion to the communication module 130 of the ROI-determining apparatus 100.

As described above, the processing module 120 obtains the first wearing portion of the wearable electronic device 200. The processing module 120 determines an ROI from the image based on the obtained first wearing portion. Methods for determining an ROI are described below in greater detail.

The processing module 120 includes one or more of a Central Processing Unit (CPU), an Application Processor (AP), or a Communication Processor (CP). For example, the processing module 120 performs control on at least one of the other components of the ROI-determining apparatus 100, and/or performs an operation or data processing relating to communication. The processing module 120 may be a controller, or may include the controller as a component of the processing module 120.

The processing module 120 executes a program or an application for processing data or commands related to at least one of the other components of the ROI-determining apparatus 100. The program includes, for example, a kernel, middleware, an Application Programming Interface (API) and/or an application program (or an application). At least a portion of the kernel, middleware, or API may be denoted an Operating System (OS). For example, the kernel controls or manages system resources such as the bus, processing module 120, or a memory, used to perform operations or functions implemented in the middleware, API, or application program. The kernel provides an interface that allows for access from the middleware, API or application program to individual components of the ROI-determining apparatus 100 to control or manage the system resources. For example, the middleware functions as a relay to allow the API or application program to communicate data with the kernel. The middleware may, in connection with task requests received from the application program, perform control such as scheduling or load balancing on the task requests using, for example, a method of assigning priority of allowing at least one application of application programs to use the system resources of the ROI-determining apparatus 100.

The API allows the application to control functions provided from the kernel or the middleware. For example, the API includes at least one interface or command for file control, window control, image-processing or text control.

As used herein, the term "application" may also be referred to as an application program.

For example, the communication module 130 configures communication between the ROI-determining apparatus 100 and an external device, such as the wearable electronic device 200 or a server. For example, the communication module 130 is connected with a network via wired or wireless communication and communicates with the external device.

The wireless communication may use at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile communication (GSM), as a cellular communication protocol. The wired connection includes at least one of Universal Serial Bus, High Definition Multimedia Interface, Recommended Standard 232 (RS-232), or Plain Old Telephone Service (POTS). The network includes at least one of a telecommunication network, such as a Local Area Network (LAN) or Wide Area Network (WAN), Internet, or a telephone network.

According to an embodiment of the present invention, the ROI-determining apparatus 100 and the wearable electronic device 200 may be directly connected with each other through short-range communication, such as Bluetooth® communication, Bluetooth® low-energy communication, Near Field Communication (NFC), Wide Fidelity (Wi-Fi)-direct communication, Infra-Red (IR) communication, visible light communication, and Zigbee® communication.

According to an embodiment of the present invention, the ROI-determining apparatus 100 may be included in a server managing the network. The server manages electronic devices in the network and, accordingly, receives and stores sensed data from the wearable electronic device. The server receives and stores images obtained from another electronic device including a camera module. The network may be implemented in various sizes and may be based on cloud computing, distributed computing, or client-server computing technology, for example.

The sensing module 210 measures a physical quantity or detects an operational state of the wearable electronic device 200, and the sensing module 210 converts the measured or detected information into an electrical signal. The sensing module 210 includes at least one of, for example, a gesture sensor, a gyro sensor, an atmospheric pressure sensor, a magnetic sensor, an acceleration sensor, a grip sensor, a proximity sensor, a color sensor, such as a Red, Green, Blue (RGB) sensor, a bio sensor, a temperature/humidity sensor, an illumination sensor, or an Ultra Violet (UV) sensor. Additionally or alternatively, the sensing module 210 includes an E-nose sensor, an ElectroMyoGraphy (EMG) sensor, an ElectroEncephaloGram (EEG) sensor, an ElectroCardioGram (ECG) sensor, an InfraRed (IR) sensor, an iris sensor, or a finger print sensor. The sensing module 210 may further include a control circuit for controlling at least one or more of the sensors included in the sensing module. According to an embodiment of the present invention, the wearable electronic device 200 may further include a processor configured to control the sensing module 210 as part of an AP or separately from the AP, and the wearable electronic device 200 controls the sensing module 210 while the AP is in a sleep mode.

According to an embodiment of the present invention, the processing module 120 detects at least one region corresponding to the first wearing portion from an image. The processing module 120 determines an ROI corresponding to at least one region detected.

According to an embodiment of the present invention, the processing module 120 obtains motion information on the wearable electronic device 200. The processing module 120 determines an ROI when the wearable electronic device 200 moves departing from a pre-determined threshold. The processing module 120 determines an ROI based on the obtained motion information and the first wearing portion.

According to an embodiment of the present invention, the processing module 120 obtains first information detected by the wearable electronic device 200 and determines the region of interest based on the type of the first information and the first wearing portion.

According to an embodiment of the present invention, the processing module 120 processes the region of interest to obtain second information, obtains the second information, and obtains third information based on the first information and the second information.

According to an embodiment of the present invention, the processing module 120 executes a first application using a result of processing the region of interest and determines an ROI based on the type of the first application and the first wearing portion.

According to an embodiment of the present invention, the processing module 120 detects a change of the wearing portion of the wearable electronic device 200 and re-determines an ROI based on the changed wearing portion.

According to an embodiment of the present invention, the image-obtaining module 110 obtains an image related to the user wearing at least one wearable electronic device, obtains a wearing portion of each of the at least one wearable electronic device, and determines an ROI in the image using the wearing portion of a first wearable electronic device of the at least one wearable electronic device, where a motion has been detected.

According to an embodiment of the present invention, the processing module 120 executes a first application using a result of image-processing. The image-obtaining module 110 obtains an image related to the user. The processing module 120 determines an ROI from the image based on the type of the first application. The processing module 120 determines an ROI based only on the type of the first application.

Figure 2:
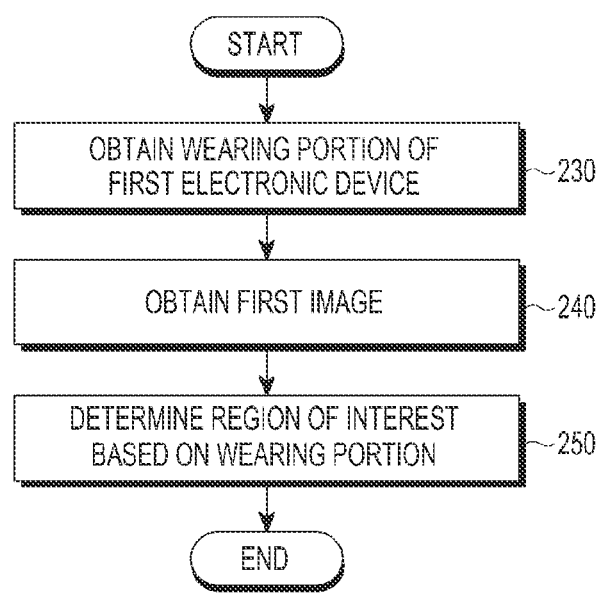
FIG. 2 is a flowchart illustrating a method for determining an ROI according to an embodiment of the present invention.
Figure 3:
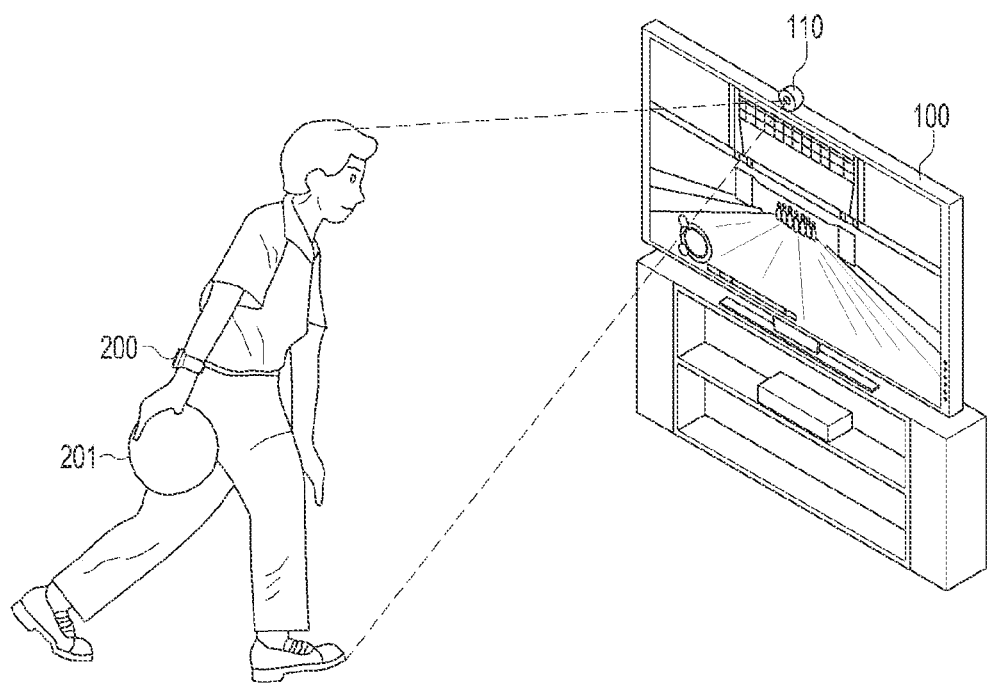
FIG. 3 illustrates an arrangement of a ROI-determining apparatus and a wearable electronic device according to an embodiment of the present invention.
Figure 4A:
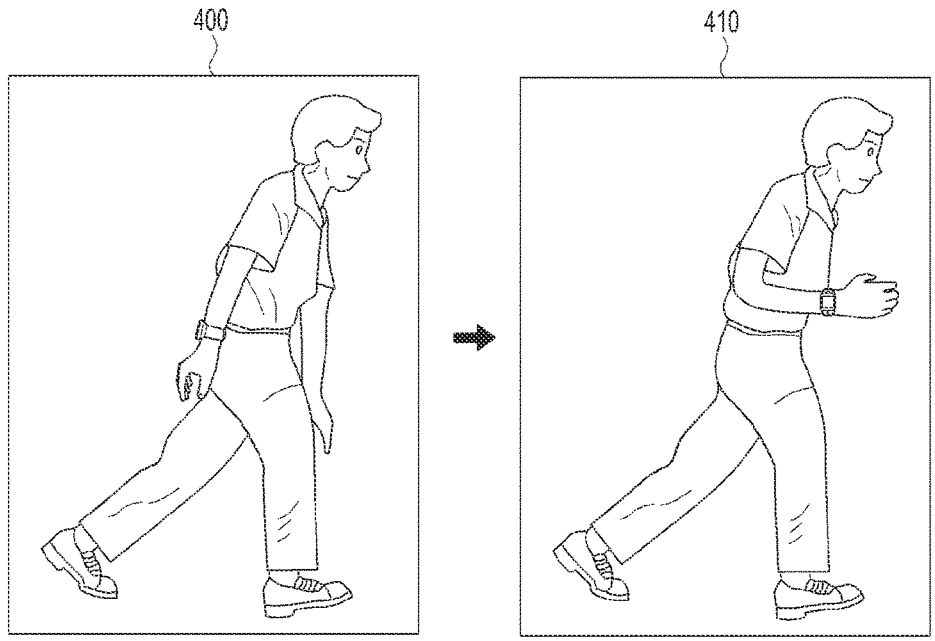
FIGS. 4A and 4B illustrate an image and an ROI according to embodiments of the present invention.
Figure 4B:
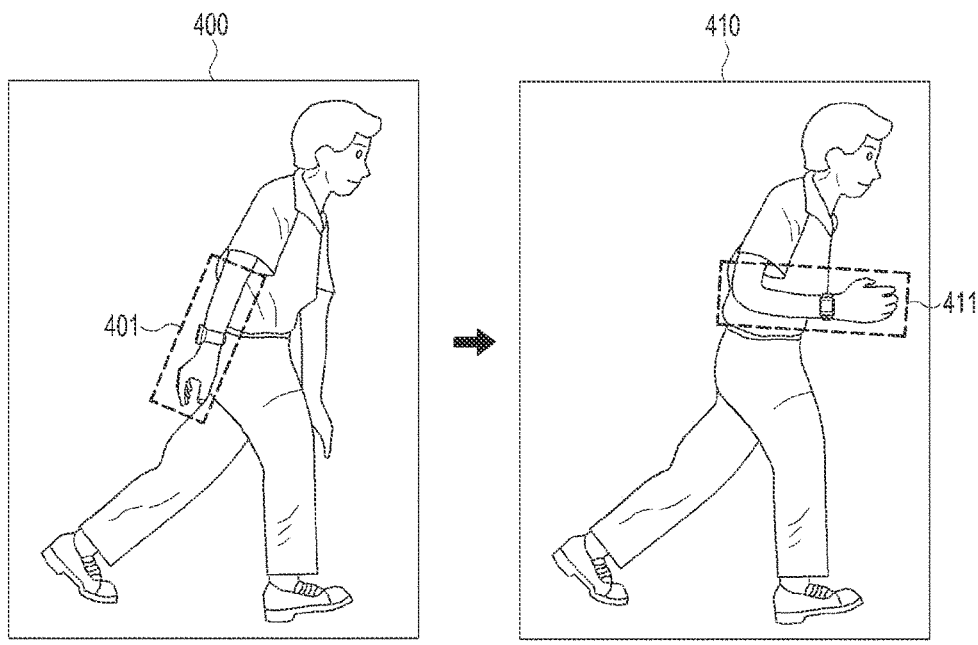

FIG. 2 is a flowchart illustrating a method for determining an ROI according to an embodiment of the present invention. An embodiment is described in detail with reference to FIG. 2 along with FIGS. 3, 4A, and 4B. FIG. 3 illustrates an arrangement of a ROI-determining apparatus and a wearable electronic device according to an embodiment of the present invention. FIGS. 4A and 4B illustrate an image and an ROI according to embodiments of the present invention. For ease of description, the wearable electronic device may be denoted a first electronic device, hereinafter. The term "wearable electronic device" is used to merely recognize a wearing portion, and it is easily appreciated by one of ordinary skill in the art that any other electronic devices that may have a wearing portion may be put to use. For example, a mobile electronic device may be included in the first electronic device as long as the mobile electronic device obtains a wearing portion according to an embodiment of the present invention.

Referring first to FIG. 2, in step 230, the ROI-determining apparatus 100 obtains a wearing portion of a first electronic device 200. For example, the ROI-determining apparatus 100 obtains association information on the first electronic device 200 and the wearing portion corresponding to the first electronic device 200. The ROI-determining apparatus 100 determines the wearing portion of the first electronic device 200 based on the obtained association information. For example, the association information includes information indicating that the first electronic device 200 is placed on the user's wrist. The ROI-determining apparatus 100 identifies that the wearing portion of the first electronic device 200 is a wrist using the obtained association information.

In step 240, the ROI-determining apparatus 100 obtains an image. According to an embodiment of the present invention, the ROI-determining apparatus 100 may capture the user as shown in FIG. 3. For example, the ROI-determining apparatus 100 includes the image-obtaining module 110, and the image-obtaining module 110 obtains an image of the user. The user wears the first electronic device 200.

The user moves while wearing the first electronic device 200. The ROI-determining apparatus 100 obtains an image while the user moves. Accordingly, the ROI-determining apparatus 100 obtains a plurality of images 400 and 410 as shown in FIG. 4A. For example, the user moves his hand like holding a ball object 201. The ROI-determining apparatus 100 obtains a first image 400 where his hand is located at a first position and a second image 410 where his hand is located at a second position.

In step 250, the ROI-determining apparatus 100 determines an ROI of the first image 400 or the second image 410 based on the wearing portion of the first electronic device 200. For example, in the embodiment shown in FIG. 3, the ROI-determining apparatus 100 identifies that the wearing portion of the first electronic device 200 is a wrist, and accordingly, the ROI-determining apparatus 100 determines an ROI based on the wrist.

According to an embodiment of the present invention, the ROI-determining apparatus 100 determines, as regions of interest 401 and 411, regions including the user's wrist, as shown in FIG. 4B. The ROI-determining apparatus 100 may previously store information on the region corresponding to the wrist. For example, when the wearing portion is a wrist, the ROI-determining apparatus 100 may be previously configured to determine, as an ROI, a region from a fingertip to an elbow or a region including at least a portion between the fingertip and the elbow, such as a rectangular region. The ROI-determining apparatus 100 detects regions corresponding to the fingertip and the elbow and regions of interest 401 or 411 based on the detected regions.

The ROI-determining apparatus 100 processes only the regions of interest 401 and 411 and may use the processed regions of interest in an application in execution. Accordingly, the ROI-determining apparatus 100 processes only the regions of interest 401 and 411 rather than the entire of each of the first image 400 and the second image 410, significantly reducing the amount of computation required for image-processing.

Figure 5:
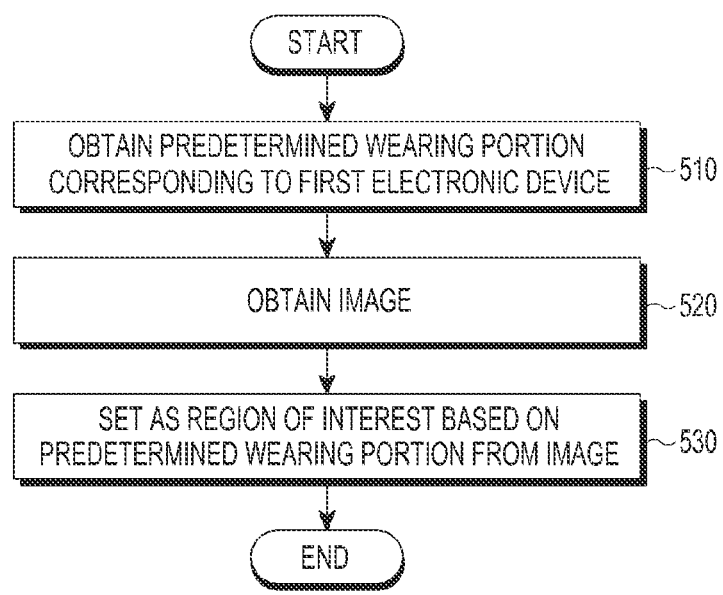
FIG. 5 is a flowchart illustrating a method for determining an ROI according to an embodiment of the present invention.

FIG. 5 is a flowchart illustrating a method for determining an ROI according to an embodiment of the present invention.

In step 510, the ROI-determining apparatus 100 obtain a pre-determined wearing portion corresponding to the first electronic device 200. For example, the ROI-determining apparatus 100 may store association information as shown in Table 1 as follows.

TABLE 1

| Type of first electronic device | Wearing portion | Corresponding region |
|---|---|---|
| Wrist watch-type electronic device | Right wrist | Fingertip, elbow |
| Anklet-type electronic device | Left ankle | Tiptoe, knee |
| Necklace-type electronic device | Neck | Torso |
| Ring-type electronic device | Finger | Fingertip, knuckle |

For example, the wrist watch-type electronic device may be preset so that the wearing portion is a right wrist as shown in Table 1. A region corresponding to the wearing portion of the wrist watch-type electronic device may be preset to a fingertip and an elbow. The right wrist being set to the wearing portion is merely an example, and different settings may be possible per user. For example, a right wrist may be set to a wearing portion for a wrist watch-type electronic device of a first user, and a left wrist may be set to a wearing portion for a wrist watch-type electronic device of a second user. The ROI-determining apparatus 100 may previously perform registration on the first electronic device 200. The ROI-determining apparatus 100 may previously set association information as shown in Table 1 during the course of registration.

The ROI-determining apparatus 100 may establish a communication link with the first electronic device 200. The ROI-determining apparatus 100 obtains identification information on the first electronic device 200 and determines the type of the first electronic device based on the obtained identification information. According to an embodiment of the present invention, the ROI-determining apparatus 100 determines that the type of the first electronic device 200 is a wrist watch-type electronic device.

In step 520, the ROI-determining apparatus 100 obtains an image.

In step 530, the ROI-determining apparatus 100 determines an ROI based on a pre-determined wearing portion from the image. For example, the ROI-determining apparatus 100 determines an ROI based on the wrist that is the wearing portion. Alternatively, the ROI-determining apparatus 100 detects a fingertip and elbow, which are regions corresponding to the wearing portion, from the image. The ROI-determining apparatus 100 determines, as an ROI, a region from the detected fingertip to the elbow or a region including at least a portion between the fingertip and the elbow, such as a rectangular region.

Figure 6A:
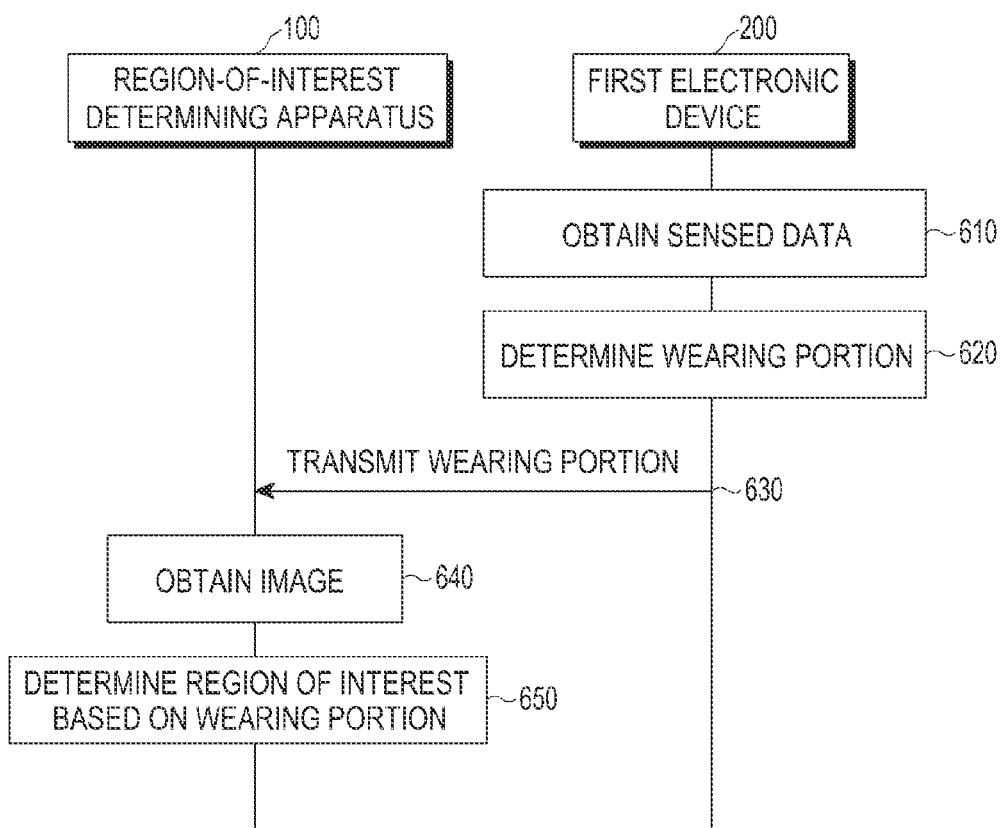
FIGS. 6A and 6B are flowcharts illustrating a method for determining an ROI according to an embodiment of the present invention.
Figure 6B:
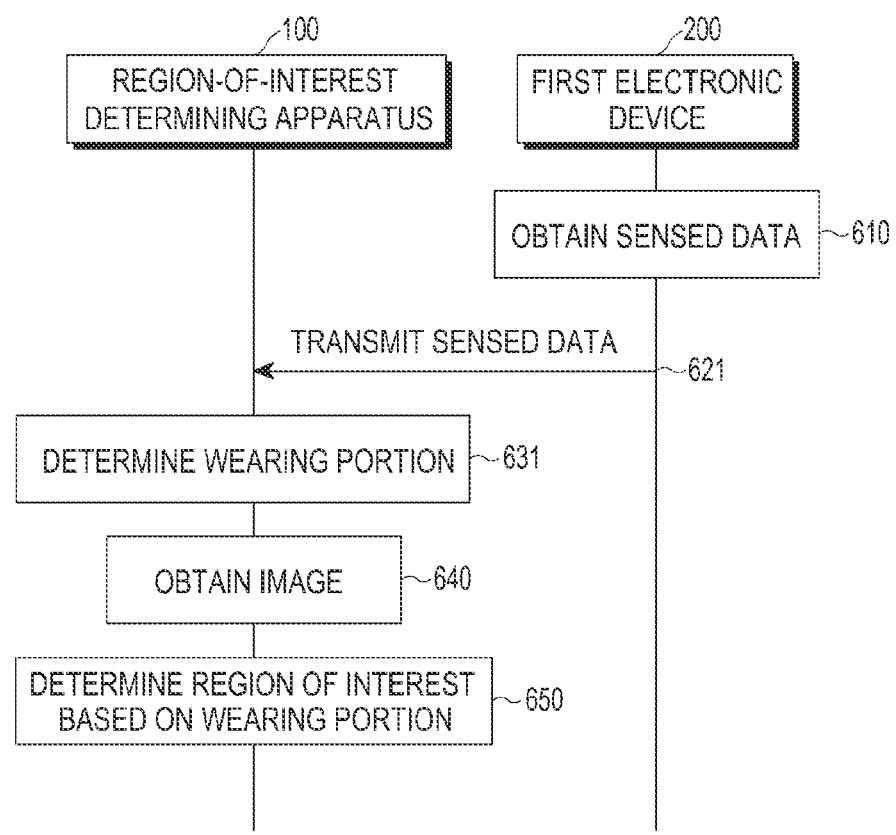

FIGS. 6A and 6B are flowcharts illustrating a method for determining an ROI according to an embodiment of the present invention.

Referring first to FIG. 6A, the first electronic device 200 obtains sensed data in step 610. For example, the first electronic device 200 obtains motion information on the first electronic device 200, obtains a bio signal, such as an ECG signal or EMG signal, from the user wearing the first electronic device 200, or obtains at least one of position information on the first electronic device 200, e.g., at least one of direction or altitude information on the first electronic device 200.

In step 620, the first electronic device 200 determines the wearing portion of the first electronic device 200 using the obtained sensed data. For example, the first electronic device 200 determines the wearing portion by comparing the motion information on the first electronic device 200 with pre-stored motion information on a body portion. Alternatively, the first electronic device 200 determines the wearing portion based on a level of the user's bio signal. Typically, a higher level of ECG signal is measured from the wrist, and a higher level of EMG signal is measured from a forearm muscle. Accordingly, when the ECG signal is greater than a pre-determined threshold, the first electronic device 200 determines that the wearing portion of the first electronic device 200 is a wrist, or determines the wearing portion based on position information.

For example, when the altitude information on the first electronic device 200 is included in a pre-determined range, the first electronic device 200 determines that the wearing portion is a wrist. The pre-determined range may be preset as a common altitude range of the wrist. The first electronic device 200 determines an orientation based on the direction information on the first electronic device 200 and determines whether it is a left or right wrist based on the obtained orientation. The above-described embodiment is merely an example. It should be appreciated by one of ordinary skill in the art that the first electronic device 200 may determine a wearing portion based on various sensed data and the scope of the present invention is not limited thereto.

In step 630, the first electronic device 200 transmits the determined wearing portion or a region corresponding to the determined wearing portion, such as information on the corresponding region, the fingertip and elbow, when the wrist is determined as the ROI, to the ROI-determining apparatus 100.

In step 640, the ROI-determining apparatus 100 obtains an image of the user.

In step 650, the ROI-determining apparatus 100 determines an ROI from the obtained image based on the wearing portion received from the first electronic device 200. Alternatively, the ROI-determining apparatus 100 obtains an ROI based on the corresponding region obtained from the first electronic device 200. For example, the ROI-determining apparatus 100 determines, as an ROI, a region from the detected fingertip to the elbow, corresponding to the wrist that is the wearing portion, or a region including at least a portion between the fingertip and the elbow, such as a rectangular region. Alternatively, the ROI-determining apparatus 100 determines a region corresponding to the received ROI and determines an ROI based on the determined corresponding region.

FIG. 6B illustrates an embodiment in which the ROI-determining apparatus 100 determines a wearing portion of the first electronic device 200, unlike what is shown in FIG. 6A.

In step 610, the first electronic device 200 obtains sensed data, such as motion information on the first electronic device 200, obtains a bio signal, such as an ECG signal or EMG signal, from the user wearing the first electronic device 200, or obtains at least one of position information on the first electronic device 200, such as at least one of direction and altitude information on the first electronic device 200.

In step 621, the first electronic device 200 transmits the obtained sensed data to the ROI-determining apparatus 100.

In step 631, the ROI-determining apparatus 100 determines the wearing portion of the first electronic device 200 using the received sensed data. For example, the ROI-determining apparatus 100 determines the wearing portion by comparing the motion information on the first electronic device 200 with pre-stored motion information on a body portion. Alternatively, the ROI-determining apparatus 100 determines the wearing portion based on a level of the user's bio signal.

Typically, a higher level of ECG signal is measured from the wrist, and a higher level of EMG signal is measured from a forearm muscle. Accordingly, when the ECG signal is greater than a pre-determined threshold, the ROI-determining apparatus 100 determines that the wearing portion of the first electronic device 200 is a wrist. Alternatively, the ROI-determining apparatus 100 determines the wearing portion based on position information on the first electronic device 200. For example, when the altitude information on the first electronic device 200 is included in a pre-determined range, the ROI-determining apparatus 100 determines that the wearing portion is a wrist.

The pre-determined range may be preset as a common altitude range of the wrist. The ROI-determining apparatus 100 determines an orientation of the first electronic device 200 based on the direction information on the first electronic device 200 and determines whether it is a left or right wrist based on the obtained orientation. The above-described embodiment is merely an example. It should be appreciated by one of ordinary skill in the art that the ROI-determining apparatus 100 determines a wearing portion based on various sensed data and the scope of the present invention is not limited thereto.

Steps 640 and 650 have been described in detail, and a description thereof will thus be omitted.

As described above in connection with FIG. 5, the wearing portion of the first electronic device 200 may be obtained based on pre-determined association information. As described above in connection with FIGS. 6A and 6B, the wearing portion of the first electronic device 200 may be determined by the first electronic device 200 or the ROI-determining apparatus 100 based on the sensed data.

Figure 7:
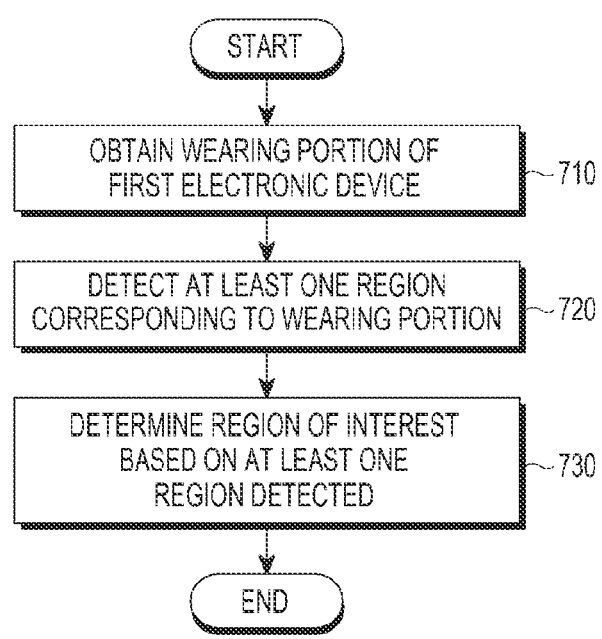
FIG. 7 is a flowchart illustrating a method for determining an ROI according to an embodiment of the present invention.
Figure 8:
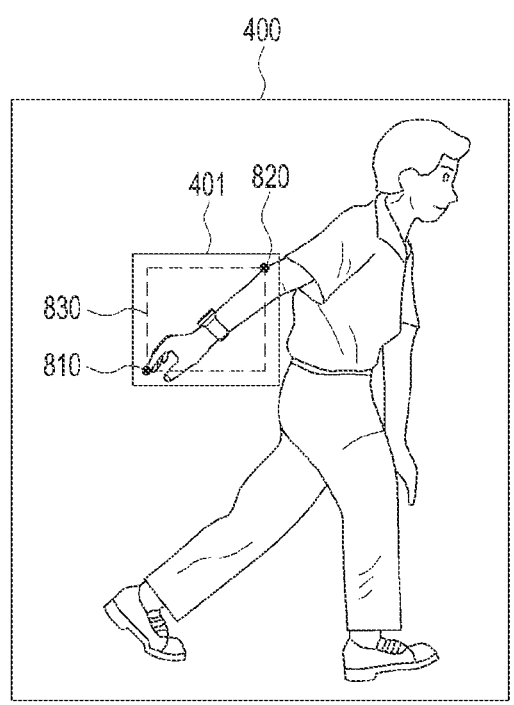
FIG. 8 illustrates an image and an ROI according to an embodiment of the present invention.

FIG. 7 is a flowchart illustrating a method for determining an ROI according to an embodiment of the present invention. An embodiment is described in detail with reference to FIG. 7 along with FIG. 8. FIG. 8 illustrates an image and an ROI according to an embodiment of the present invention.

In step 710, the ROI-determining apparatus 100 obtains a wearing portion of the first electronic device 200. The ROI-determining apparatus 100 obtains a wearing portion based on association information on the wearing portion of the first electronic device 200, receives a wearing portion determined by the first electronic device 200, or determines a wearing portion of the first electronic device 200 based on sensed data received from the first electronic device 200. According to the instant embodiment, it is assumed that the ROI-determining apparatus 100 determines a right wrist as the wearing portion of the first electronic device 200.

According to an embodiment of the present invention, the ROI-determining apparatus 100 determines a wearing portion based on motion information received from the first electronic device 200. For example, when the user uses his right arm, the user performs an operation in a first direction more frequently than an operation in a second direction that is opposite the first direction. When the user uses his left arm, the user performs an operation in the second direction more frequently than an operation in the first direction, for example. The ROI-determining apparatus 100 receives motion information, such as rotation information, from the first electronic device 200. When determining based on the motion information on the first electronic device 200 that rotation in the first direction has occurred more frequently, the ROI-determining apparatus 100 determines that the first electronic device 200 is worn on the right arm.

In step 720, the ROI-determining apparatus 100 detects at least one region corresponding to the wearing portion. For example, the ROI-determining apparatus 100 identifies that the region corresponding to the right wrist is a fingertip and an elbow based on the association information shown in Table 1. The ROI-determining apparatus 100 detects corresponding regions 810 and 820 from the obtained image as shown in FIG. 8. The corresponding region 810 may be a fingertip, and the corresponding region 820 may be an elbow.

In step 730, the ROI-determining apparatus 100 determines an ROI corresponding to at least one detected region. For example, the ROI-determining apparatus 100 determines an ROI based on the corresponding regions 810 and 820 as shown in FIG. 8. The ROI-determining apparatus 100 determines, as an ROI, a region between the corresponding regions 810 and 820 or a region including at least a portion between the fingertip and the elbow, such as a rectangular region 830.

As described above, the ROI-determining apparatus 100 sets an ROI 401 including the wearing portion or determines an ROI 830 based on the regions 810 and 820 corresponding to the wearing portion.

Figure 9:
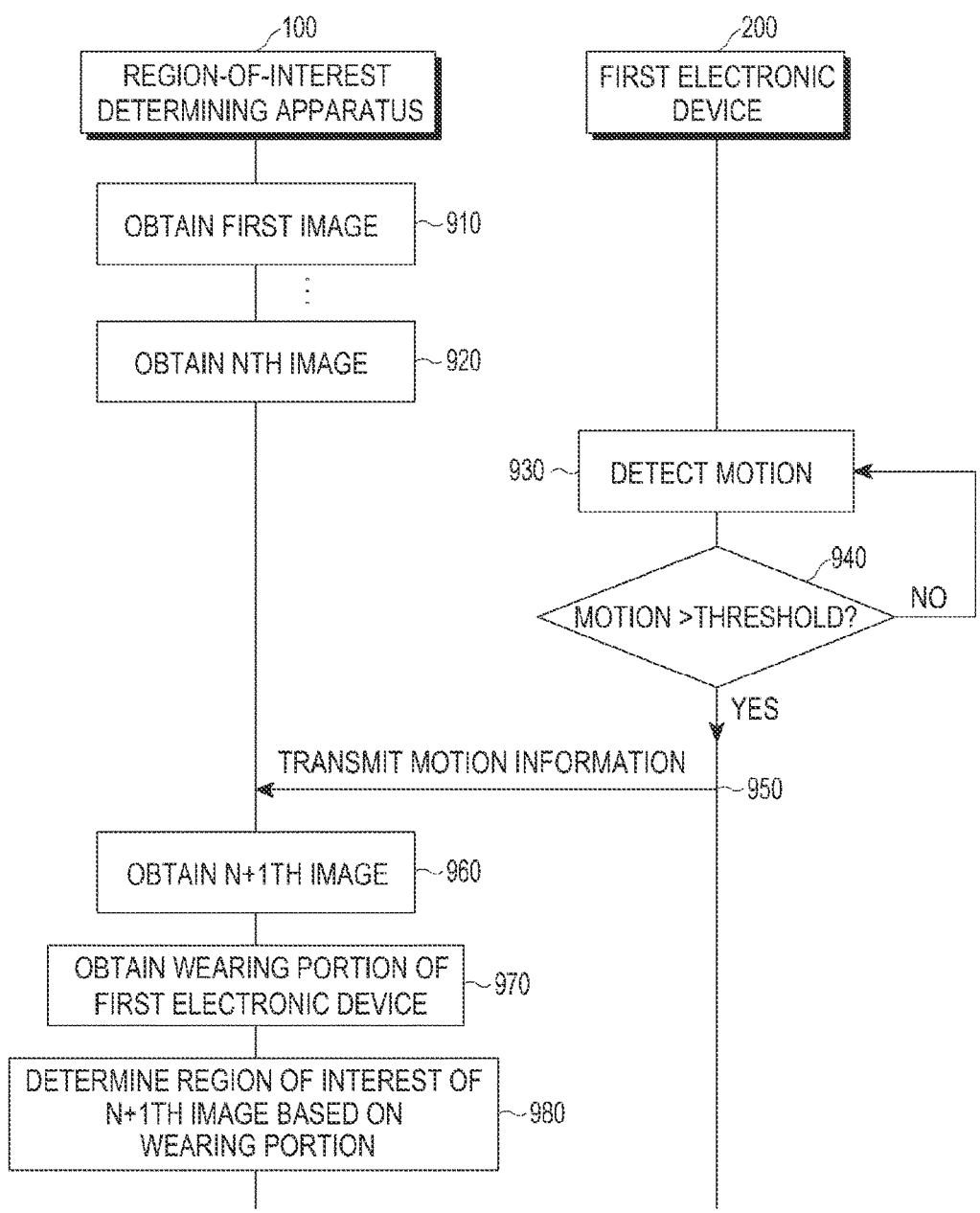
FIG. 9 is a flowchart illustrating a method for determining an ROI according to an embodiment of the present invention.
Figure 10:
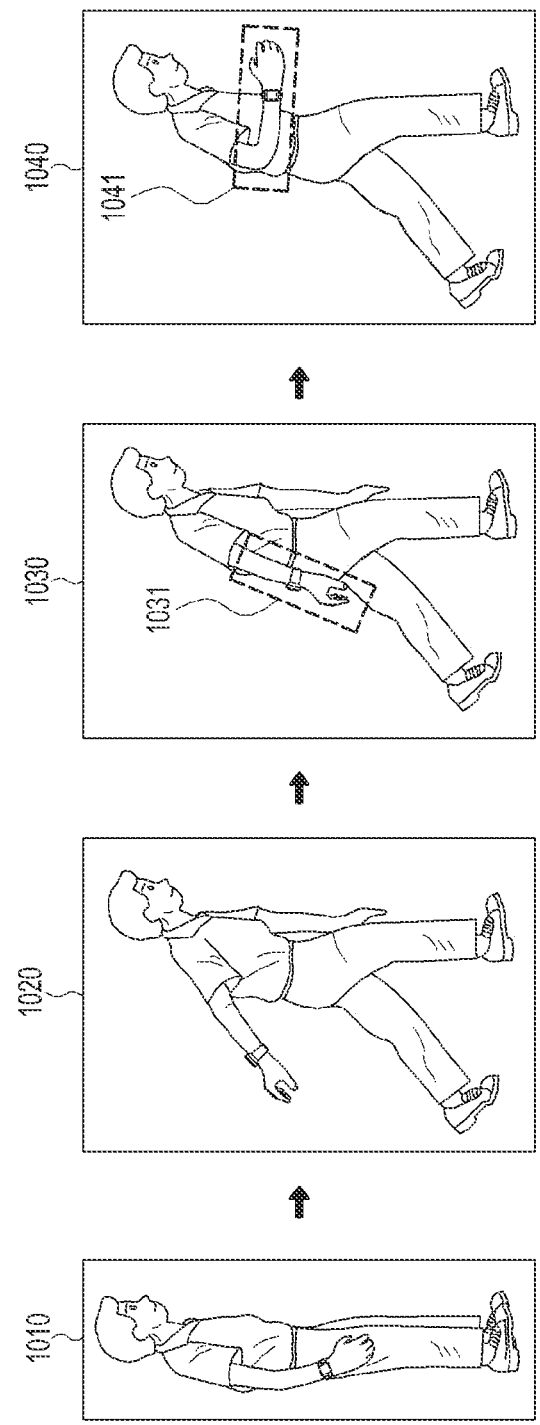
FIG. 10 illustrates an image and an ROI according to an embodiment of the present invention.

FIG. 9 is a flowchart illustrating a method for determining an ROI according to an embodiment of the present invention. An embodiment is described in detail with reference to FIG. 9 along with FIG. 10. FIG. 10 illustrates an image and an ROI according to an embodiment of the present invention.

In step 910, the ROI-determining apparatus 100 obtains a first image. In step 920, the ROI-determining apparatus 100 obtains an nth image. n is a natural number greater than 1. Although not shown, the ROI-determining apparatus 100 obtains an image between steps 910 and 920.

In step 930, the first electronic device 200 detects a motion of the first electronic device 200, such as based on at least one of a displacement, velocity, and acceleration of the first electronic device 200.

In step 940, the first electronic device 200 determines whether the detected motion exceeds a threshold, which may be preset to a level at which the user's routine motion may be distinguished from his intended motion.

According to an embodiment of the present invention, the first electronic device 200 transmits the motion information to the ROI-determining apparatus 100 without performing the comparison process, and the comparison on whether the motion is larger or smaller than the threshold is performed by the ROI-determining apparatus 100.

In step 950, when the detected motion of the first electronic device 200 is greater than the threshold, the first electronic device 200 transmits the motion information to the ROI-determining apparatus 100. When the detected motion of the first electronic device 200 is less than or equal to the threshold, the first electronic device 200 does not transmit the motion information.

In step 960, the ROI-determining apparatus 100 obtains an n+1th image.

In step 970, the ROI-determining apparatus 100 obtains a wearing portion of the first electronic device 200. The ROI-determining apparatus 100 obtains a wearing portion based on association information on the wearing portion of the first electronic device 200, receives a wearing portion determined by the first electronic device 200, or determines a wearing portion of the first electronic device 200 based on sensed data received from the first electronic device 200.

In step 980, the ROI-determining apparatus 100 determines an ROI in the n+1th image based on the obtained wearing portion. That is, the ROI-determining apparatus 100 performs determination of an ROI and image-processing by using the motion of the first electronic device 200 as a trigger.

For example, the ROI-determining apparatus 100 obtains a first image 1010 to a fourth image 1040 as shown in FIG. 10. It is assumed that the ROI-determining apparatus 100 obtains motion information from the first electronic device 200 after obtaining a second image 1020.

The ROI-determining apparatus 100 does not perform configuration of an ROI and image-processing before obtaining the motion information from the first electronic device 200. Consequently, the ROI-determining apparatus 100 performs configuration of an ROI and image-processing after obtaining the motion information. For example, the ROI-determining apparatus 100 determines an ROI 1031 on a third image 1030 and an ROI 1041 on the fourth image 1040.

The ROI-determining apparatus 100 monitors the user wearing the first electronic device 200. When the user performs an intended motion, the ROI-determining apparatus 100 performs configuration of an ROI and image-processing on the ROI. Accordingly, when the user wears a plurality of first electronic devices, an ROI corresponding to a first electronic device from which a motion has been detected, rather than all the first electronic devices, is configured.

Figure 11:
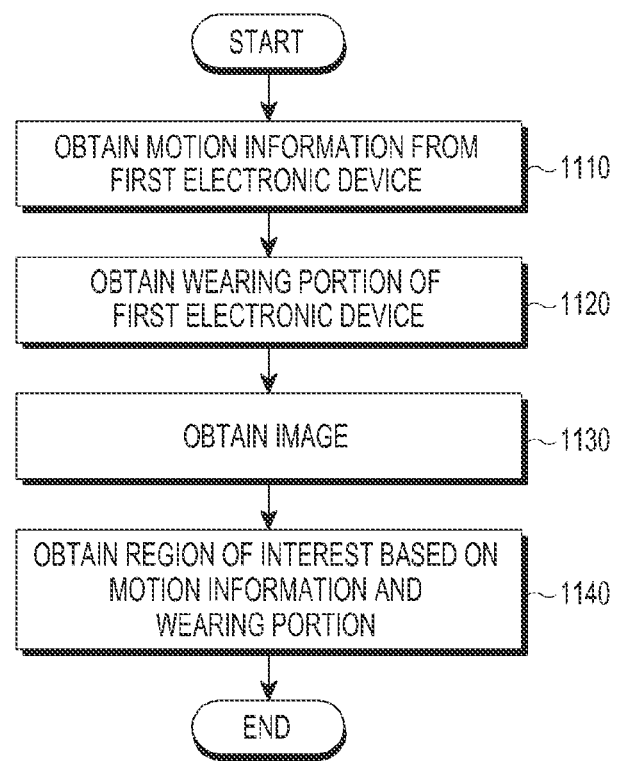
FIG. 11 is a flowchart illustrating a method for setting an ROI according to an embodiment of the present invention.

FIG. 11 is a flowchart illustrating a method for setting an ROI according to an embodiment of the present invention. An embodiment is described in detail with reference to FIG. 11 along with FIGS. 12A to 12D. FIGS. 12A to 12D illustrate a user, an image, and an ROI according to embodiments of the present invention.

Figure 12A:
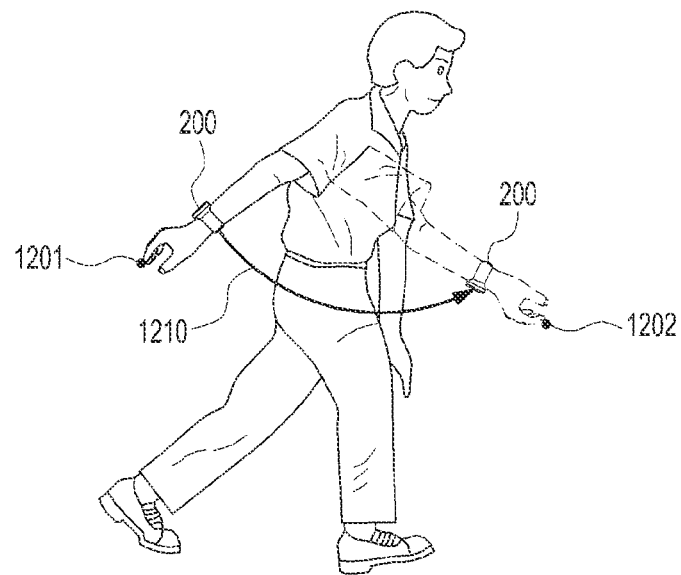
FIGS. 12A to 12D illustrate a user, an image, and an ROI according to embodiments of the present invention.

In step 1110, the ROI-determining apparatus 100 obtains motion information from the first electronic device 200. For example, the first electronic device 200 senses motion information 1210 indicating that the right arm has moved from a first position 1201 to a second position 1202, as shown in FIG. 12A. The first electronic device 200 obtains the motion information 1210 based on at least one of a displacement, velocity, and acceleration of the first electronic device 200. The ROI-determining apparatus 100 obtains obtain the motion information 1210 from the first electronic device 200.

In step 1120, the ROI-determining apparatus 100 obtains a wearing portion of the first electronic device 200. The ROI-determining apparatus 100 obtains a wearing portion based on association information on the wearing portion of the first electronic device 200, receives a wearing portion determined by the first electronic device 200, or determines a wearing portion of the first electronic device 200 based on sensed data received from the first electronic device 200.

Figure 12B:
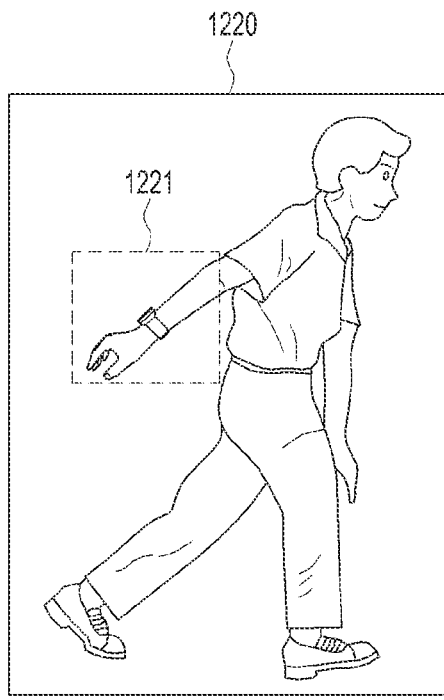
Figure 12C:
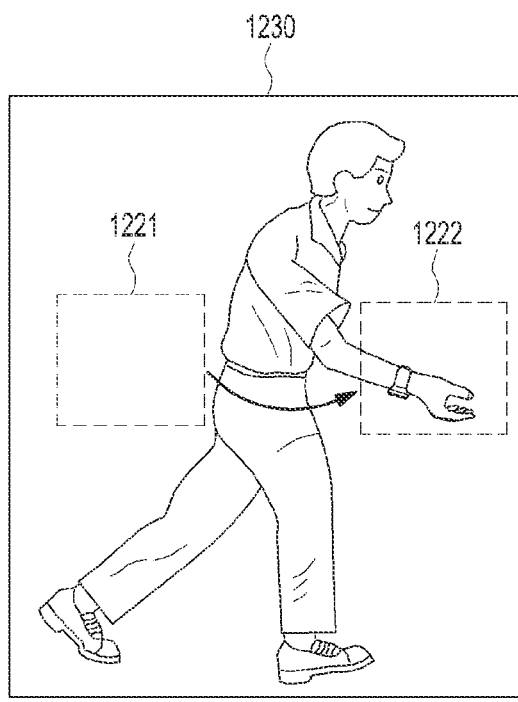

In step 1130, the ROI-determining apparatus 100 obtains an image. For example, the ROI-determining apparatus 100 obtains a first image 1220 and a second image 1230 as shown in FIGS. 12B and 12C.

In step 1140, the ROI-determining apparatus 100 obtains an ROI based on the motion information and wearing portion. The ROI-determining apparatus 100 determines an ROI 1221 based on the wearing portion of the first electronic device 200 in the first image 1220 of FIG. 12B, and determines an ROI 1222 based on the motion information 1210 and the wearing portion of the first electronic device 200 in the second image 1230 of FIG. 12C. Specifically, the ROI-determining apparatus 100 determines the ROI 1222 of the second image 1230 by applying the motion information 1210 to the ROI 1221 of the first image 1220. The ROI-determining apparatus 100 identifies vector information and scale information of the motion information. The ROI-determining apparatus 100 determines the position to which the ROI 1221 has moved as the position of the ROI 1222 by applying the identified vector information and scale information.

Figure 12D:
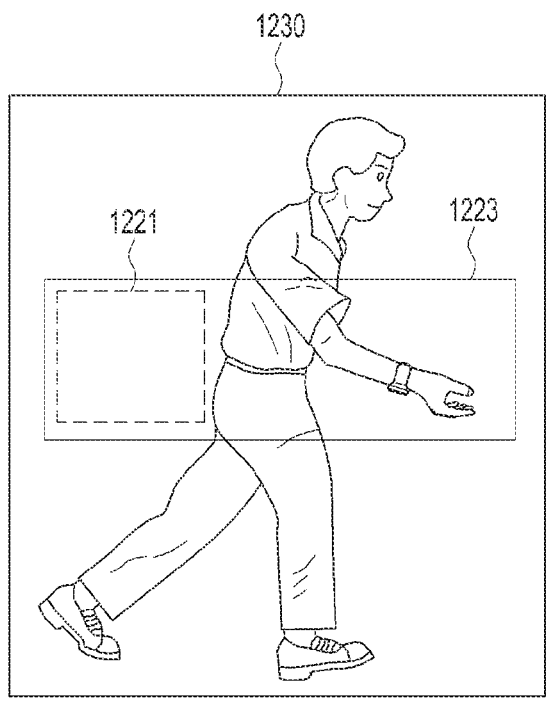

According to an embodiment of the present invention, the ROI-determining apparatus 100 expands the ROI 1223 as shown in FIG. 12D. For example, the ROI-determining apparatus 100 identifies vector information and scale information of the motion information. The ROI-determining apparatus 100 determines a region corresponding to the identified vector information and scale information of the motion information as the ROI 1223.

As described above, the ROI-determining apparatus 100 determines an ROI of an image based on a wearing portion of the first electronic device 200 and adaptively re-determines the determined region of interest based on the motion information on the first electronic device 200.

Figure 13:
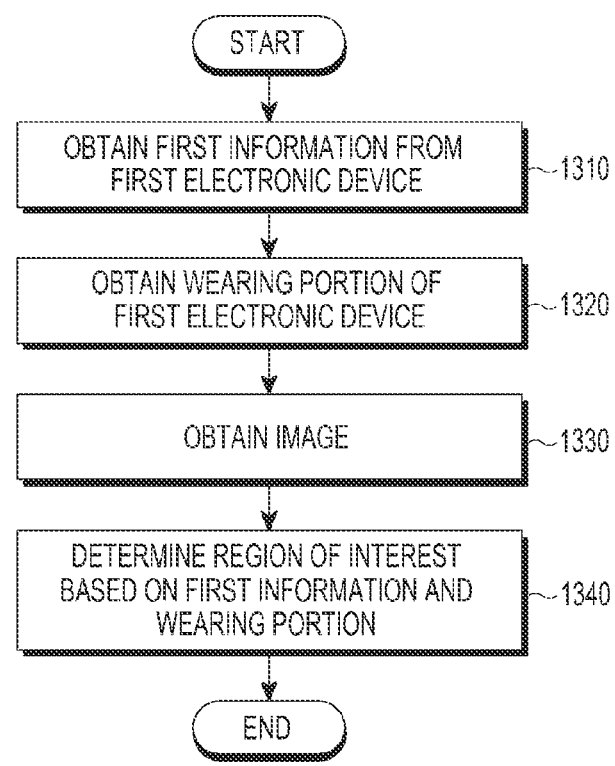
FIG. 13 is a flowchart illustrating a method for determining an ROI according to an embodiment of the present invention.
Figure 14A:
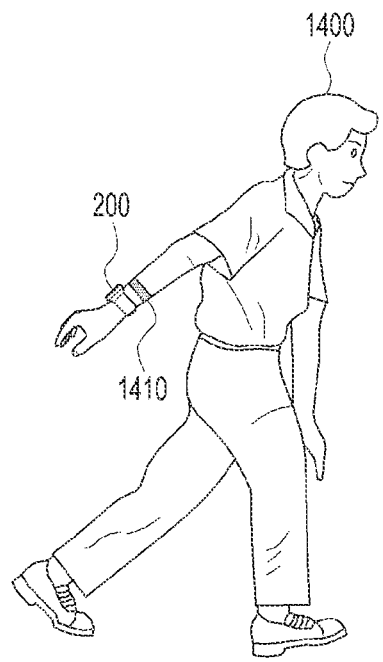
FIGS. 14A and 14B illustrate a first electronic device and an image according to an embodiment of the present invention.
Figure 14B:
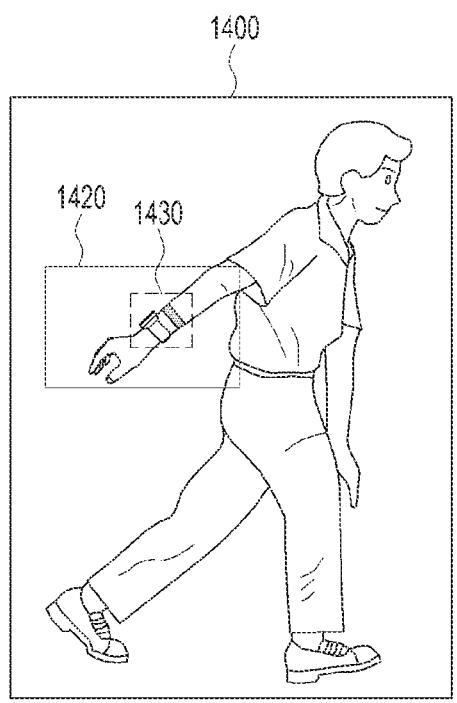

FIG. 13 is a flowchart illustrating a method for determining an ROI according to an embodiment of the present invention. An embodiment is described in detail with reference to FIG. 13 along with FIGS. 14A and 14B. FIGS. 14A and 14B illustrate a first electronic device and an image according to an embodiment of the present invention.

As shown in FIG. 14A, in step 1310, the ROI-determining apparatus 100 obtains first information from the first electronic device 200. For example, the first electronic device 200 is worn on the user's wrist 1410 and obtains sensed muscular data of the user's wrist 1410. The first electronic device 200 transmits the obtained sensed muscular data to the ROI-determining apparatus 100. Accordingly, the ROI-determining apparatus 100 obtains first information.

In step 1320, the ROI-determining apparatus 100 obtains a wearing portion of the first electronic device 200 based on association information on the wearing portion of the first electronic device 200, receives a wearing portion determined by the first electronic device 200, or determines a wearing portion of the first electronic device 200 based on sensed data received from the first electronic device 200. For example, the ROI-determining apparatus 100 determines a wrist 1410 as the wearing portion of the first electronic device 200.

In step 1330, the ROI-determining apparatus 100 obtains an image 1400.

According to an embodiment of the present invention, the ROI-determining apparatus 100 executes different applications based on the obtained first information. For example, when the first information is sensed muscular data and the first information is movement information sensed by a gyro sensor, the ROI-determining apparatus 100 executes different applications.

As shown in FIG. 14B4B, in step 1340, the ROI-determining apparatus 100 determines an ROI based on the first information and the wearing portion 1610. For example, the ROI-determining apparatus 100 determines an ROI 1430 based on the wearing portion 1610, sensed muscular data, and the first information received from the first electronic device 200, and determines a narrower region where an electromyogram is sensed in the region of interest 1420 corresponding to the wrist 1610 as ROI 1430.

As described above, the ROI-determining apparatus 100 determines an ROI using information from the first electronic device 200 together with the wearing portion, according to an embodiment of the present invention. Although not shown, the ROI-determining apparatus 100 determines an ROI only using the information obtained from the first electronic device 200 without using the wearing portion, according to an embodiment of the present invention.

Figure 15:
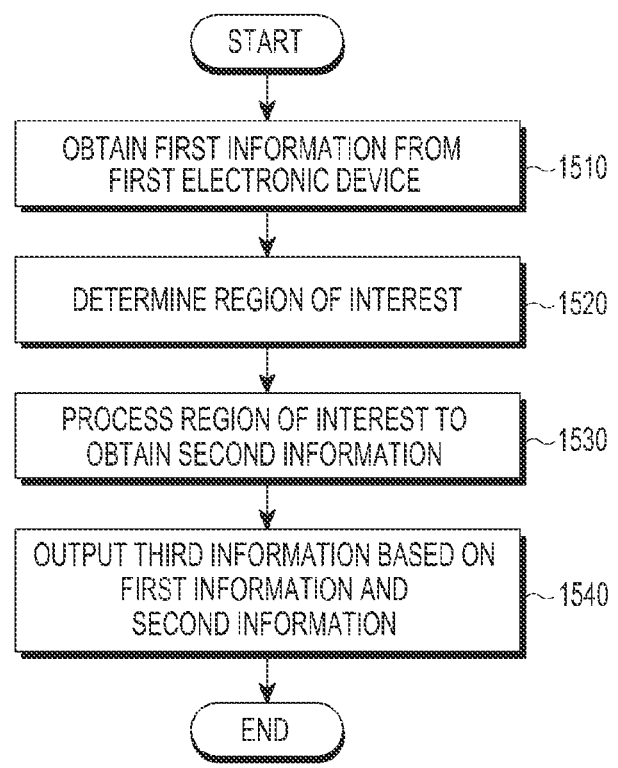
FIG. 15 is a flowchart illustrating a method for processing an ROI according to an embodiment of the present invention.
Figure 16:
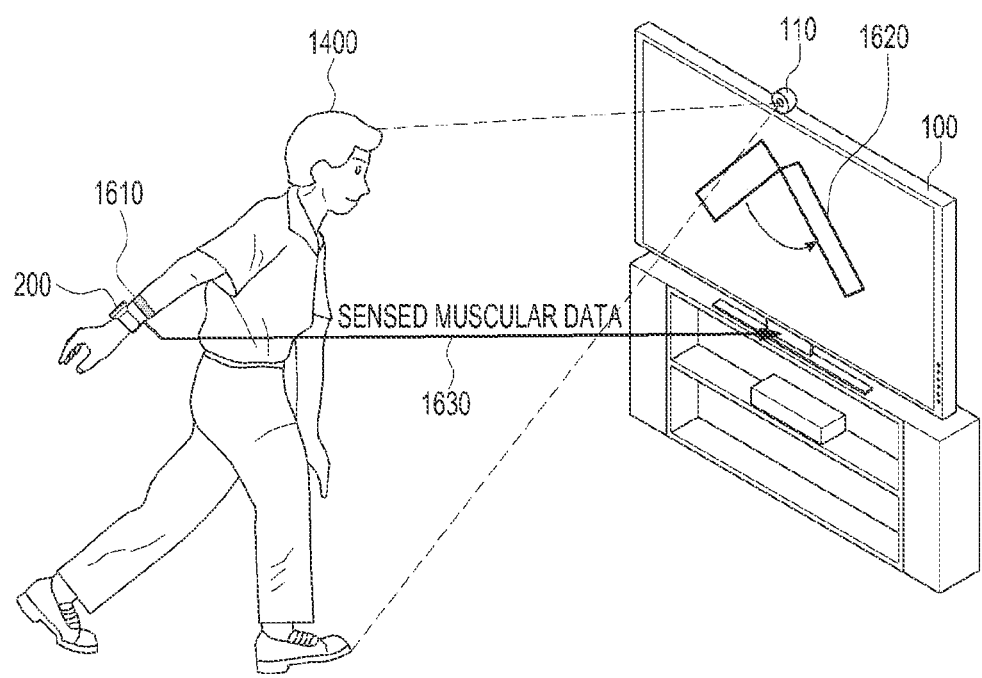
FIG. 16 illustrates wearing a first electronic device according to an embodiment of the present invention.

FIG. 15 is a flowchart illustrating a method for processing an ROI according to an embodiment of the present invention. An embodiment is described in detail with reference to FIG. 15 along with FIG. 16. FIG. 16 illustrates wearing a first electronic device according to an embodiment of the present invention.

In step 1510, the ROI-determining apparatus 100 obtains first information from the first electronic device 200. For example, the first electronic device 200 is worn on the user's wrist 1610 and obtains sensed muscular data of the user's wrist 1610. The first electronic device 200 transmits the obtained sensed muscular data to the ROI-determining apparatus 100. Accordingly, the ROI-determining apparatus 100 obtains first information 1630.

In step 1520, the ROI-determining apparatus 100 determines an ROI. The ROI-determining apparatus 100 determines an ROI from an image based on the obtained wearing portion of the first electronic device 200.

In step 1530, the ROI-determining apparatus 100 processes the region of interest to obtain second information 1620. For example, as shown in FIG. 16, the ROI-determining apparatus 100 obtains motion information on the user's right wrist as the second information 1620 by processing an ROI.

In step 1540, the ROI-determining apparatus 100 obtains third information based on the first information 1630 and the second information 1620. For example, the ROI-determining apparatus 100 obtains the third information based on the user's arm movement and muscular contraction and relaxation based on sensed muscular data and motion information. The ROI-determining apparatus 100 executes a ball-throwing application and obtains the third information, such as the ball's speed or degree of curving based on the user's arm movement and muscular contraction and relaxation. In particular, the ROI-determining apparatus 100 performs image-processing only on the ROI. Accordingly, the ROI-determining apparatus 100 outputs the third information requiring frequent computation with secured resources.

Figure 17A:
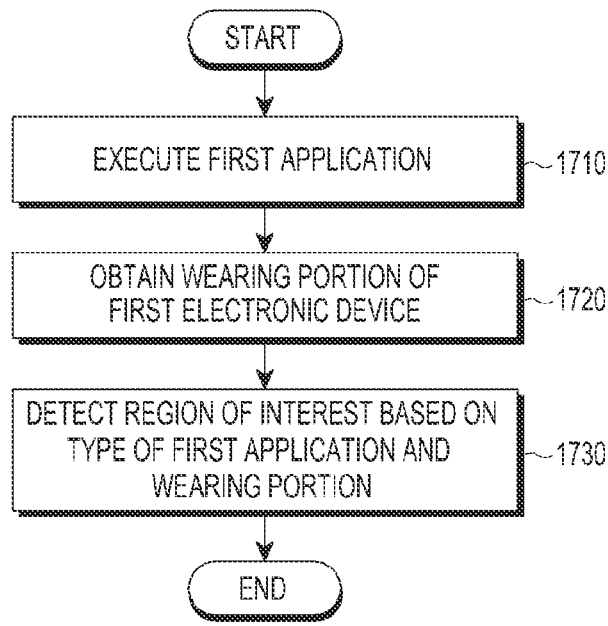
FIGS. 17A and 17B are flowcharts illustrating a method for determining an ROI according to an embodiment of the present invention.
Figure 17B:
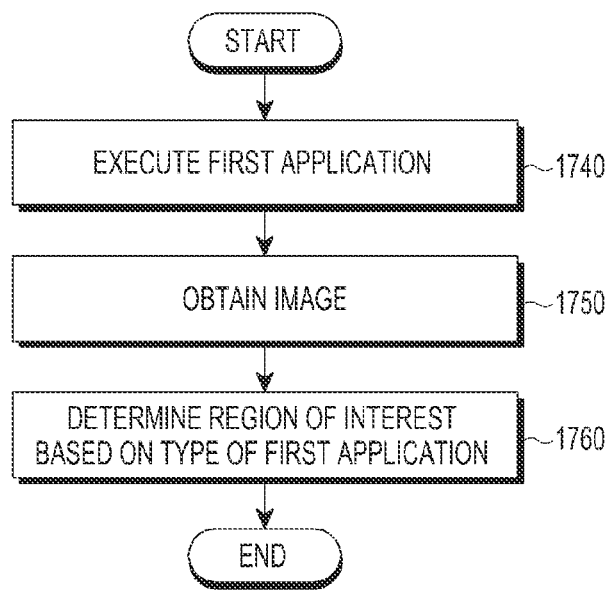
Figure 18:
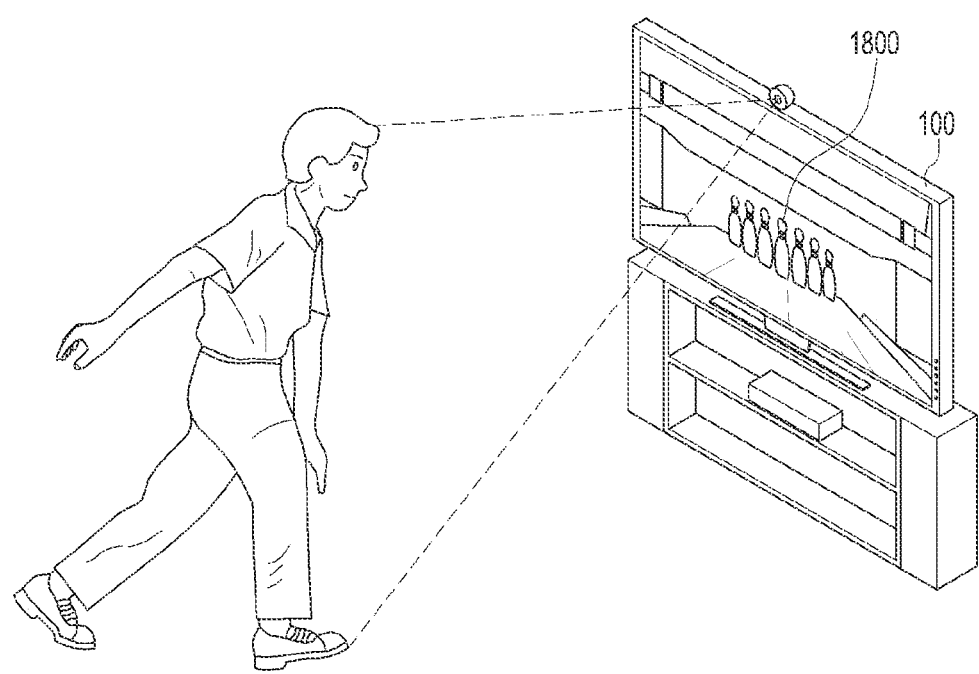
FIG. 18 illustrates a process of executing a first application according to an embodiment of the present invention.

FIGS. 17A and 17B are flowcharts illustrating a method for determining an ROI according to an embodiment of the present invention, and will be described in conjunction with FIG. 18 which illustrates a process of executing a first application according to an embodiment of the present invention.

In step 1710, the ROI-determining apparatus 100 executes a first application. For example, the ROI-determining apparatus 100 executes the first application of a sports game application.

In step 1720, the ROI-determining apparatus 100 obtains a wearing portion of the first electronic device 200. The ROI-determining apparatus 100 obtains a wearing portion based on association information on the wearing portion of the first electronic device 200, receives a wearing portion determined by the first electronic device 200, or determines a wearing portion of the first electronic device 200 based on sensed data received from the first electronic device 200.

In step 1730, the ROI-determining apparatus 100 determines an ROI based on the type of the first application and the wearing portion. For example, the ROI-determining apparatus 100 determines an ROI from an image based on the sports game application and the information that the wearing portion is a wrist. Alternatively, the ROI-determining apparatus 100 determines an ROI based on data from the first application and the wearing portion.

Referring to FIG. 17B, in step 1740, the ROI-determining apparatus 100 executes the first application. For example, the ROI-determining apparatus 100 executes the first application 1800 of a sports game application. As shown in FIG. 18, the user does not wear the first electronic device 200.

In step 1750, the ROI-determining apparatus 100 obtains an image related to the user. In step 1760, the ROI-determining apparatus 100 determines an ROI based on the type of the first application 1800. For example, when the first application 1800 is a sports game application as shown in FIG. 18, the ROI-determining apparatus 100 determines, as the region of interest, a region including the user's wrist. That is, as shown in FIG. 17B, the ROI-determining apparatus 100 determines an ROI based only on the type of application.

Figure 19A:
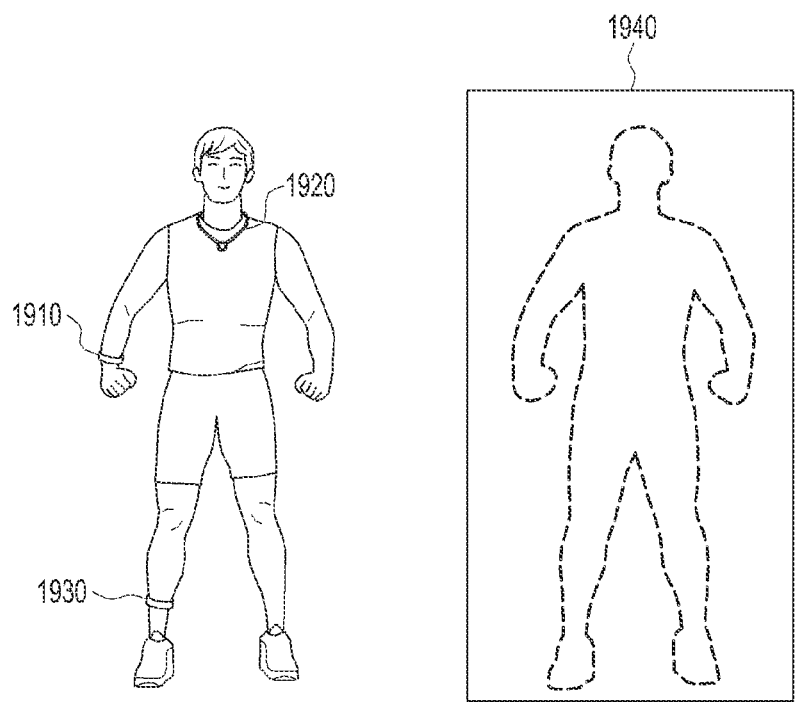
FIGS. 19A and 19B illustrate images of a user wearing a plurality of first electronic devices according to embodiments of the present invention.
Figure 19B:
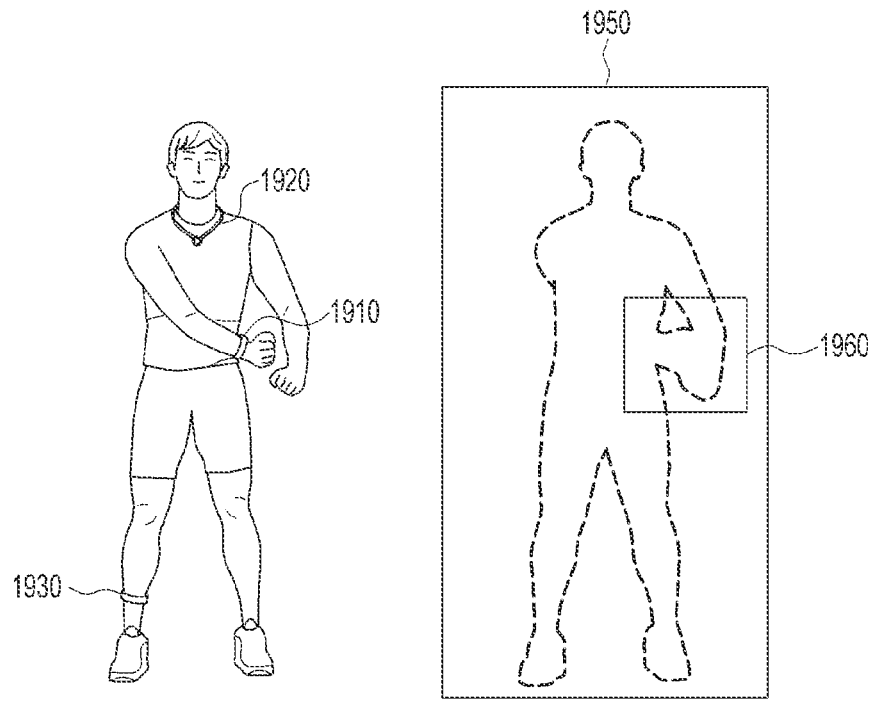

FIGS. 19A and 19B illustrate images of a user wearing a plurality of first electronic devices according to embodiments of the present invention.

As shown in FIG. 19A, the user wears a wrist watch-type electronic device 1910 on his right wrist. The user wears a necklace-type electronic device 1920 on his neck. The user wears an anklet-type electronic device 1930 on his right ankle. The ROI-determining apparatus 100 obtains an image 1940 of the user.

As shown in FIG. 19B, the user moves his right arm to the left. The ROI-determining apparatus 100 receives motion information from the wrist watch-type electronic device 1910. The ROI-determining apparatus 100 does not receive motion information from the necklace-type electronic device 1920 or the anklet-type electronic device 1930. The ROI-determining apparatus 100 obtains a wearing portion of the wrist watch-type electronic device 1910 determined to have moved. The ROI-determining apparatus 100 determines a region 1960 from the image 1950 based on the obtained wearing portion of the wrist watch-type electronic device 1910.

Figure 20:
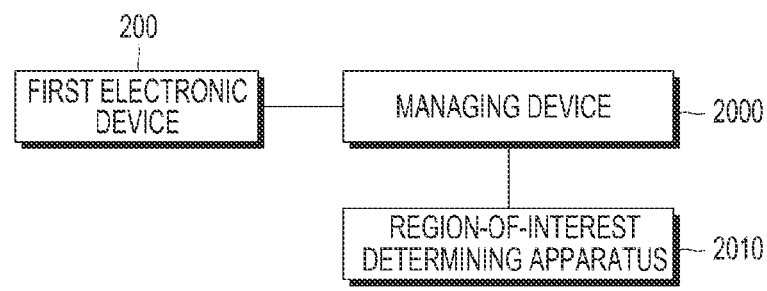
FIG. 20 is a block diagram illustrating a network according to an embodiment of the present invention.

FIG. 20 is a block diagram illustrating a network according to an embodiment of the present invention.

As shown in FIG. 20, a managing device 2000 managing the network is connected with a first electronic device 200 and a ROI-determining apparatus 2010. The managing device 2000 obtains a wearing portion of the first electronic device 200. The managing device 2000 obtains a wearing portion based on association information on the wearing portion of the first electronic device 200, receives a wearing portion determined by the first electronic device 200, or determines a wearing portion of the first electronic device 200 based on sensed data received from the first electronic device 200.

The managing device 2000 transmits the wearing portion to the ROI-determining apparatus 2010, and the ROI-determining apparatus 2010 determines an ROI from an image based on the wearing portion and performs image-processing on the determined region of interest. Alternatively, the managing device 2000 determines an ROI based on the wearing portion, and transmits the determined ROI to the ROI-determining apparatus 2010 which performs image-processing on the received ROI.

Figure 21:
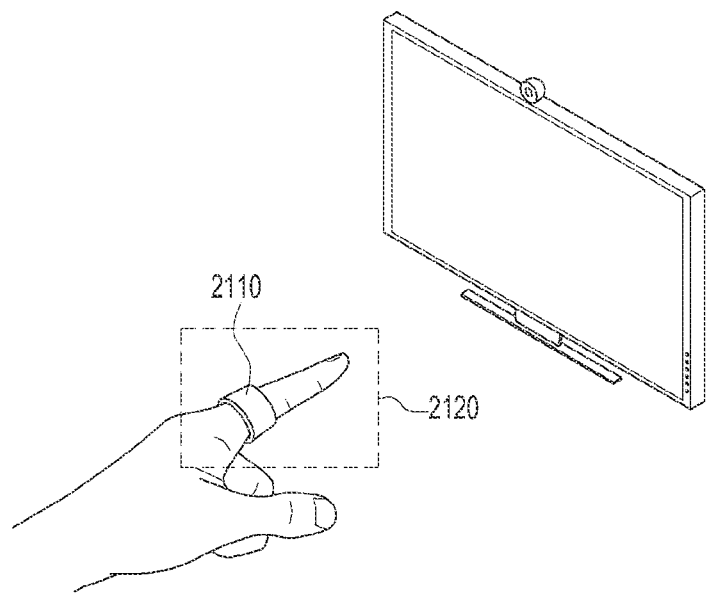
FIG. 21 illustrates a method for determining an ROI according to an embodiment of the present invention.

FIG. 21 illustrates a method for determining an ROI according to an embodiment of the present invention.

As shown in FIG. 21, the user wears a ring-type electronic device 2110 on his finger. The ROI-determining apparatus 100 obtains an image including the user's finger. The ROI-determining apparatus 100 determines a pre-determined wearing portion based on the type of the ring-type electronic device 2110. For example, the ROT-determining apparatus 100 determines a finger as the wearing portion of the ring-type electronic device 2110. The ROI-determining apparatus 100 determines a ROI 2120 based on the obtained wearing portion. The ROI-determining apparatus 100 may output a manipulation signal, such as a volume manipulation signal, by performing image-processing on the ROI 2120.

Figure 22:
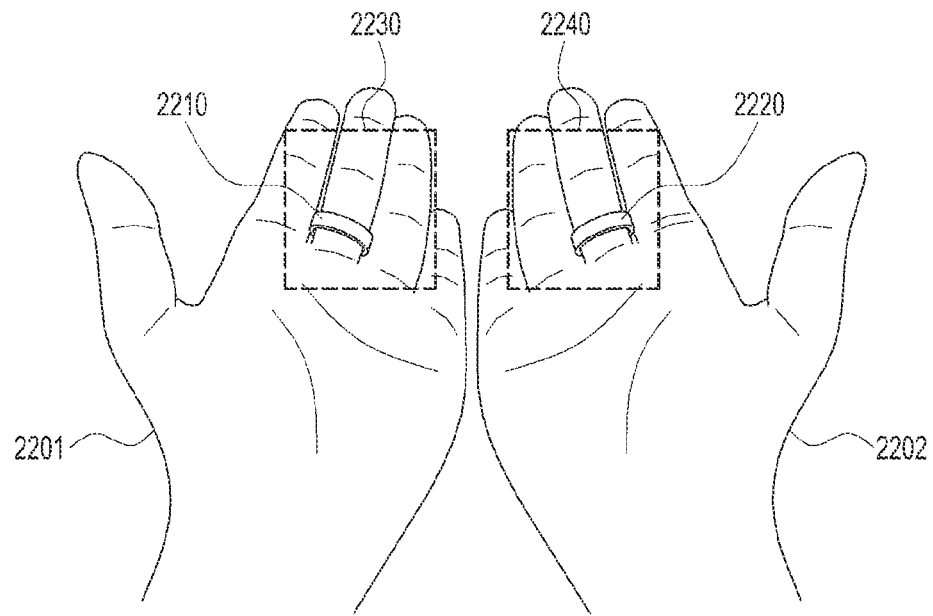
FIG. 22 illustrates a method for determining an ROI according to an embodiment of the present invention.

FIG. 22 illustrates a method for determining an ROI according to an embodiment of the present invention.

As shown in FIG. 22, the user wears a normal ring 2210, not an electronic device, on his left hand 2201 and a ring-type electronic device 2220 on his right hand 2202. The conventional ROI-determining apparatus 100 may set an ROI based on a feature point, and accordingly, the conventional ROI-determining apparatus 100 determines both the left hand 2201 and right hand 2202 as ROIs 2230 and 2240, failing to differentiate the normal ring 2210 that is not an electronic device through data recognized from the image-processing module. In contrast, the ROI-determining apparatus 100 according to an embodiment of the present invention identifies that the wearing portion of the ring-type electronic device 2220 is the right hand 2202. For example, the wearing portion of the ring-type electronic device 2220 may be previously stored in the ROI-determining apparatus 100. Alternatively, the ROI-determining apparatus 100 determines a wearing portion based on sensed data obtained from the ring-type electronic device 2220. The ROI-determining apparatus 100 according to an embodiment of the present invention determines only the ROT 2240 for the right hand 2202 based on the obtained wearing portion.

Figure 23:
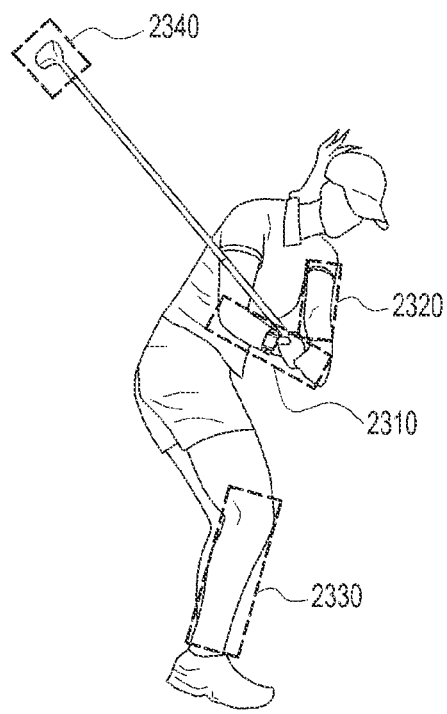
FIG. 23 illustrates a method for determining an ROI according to an embodiment of the present invention.

FIG. 23 illustrates a method for determining an ROI according to an embodiment of the present invention.

In the embodiment shown in FIG. 23, the ROI-determining apparatus 100 determines an ROI based on the type of an application in execution and a wearing portion of the first electronic device 200.

For example, the ROI-determining apparatus 100 executes a golf game application. The ROI-determining apparatus 100 determines a ROI 2310 based on a wearing portion of the first electronic device 200. The ROI-determining apparatus 100 additionally determines, as other ROIs, pre-determined body portions 2320 to 2340 to be accurately collected since the application in execution is a golf game application.

Figure 24:
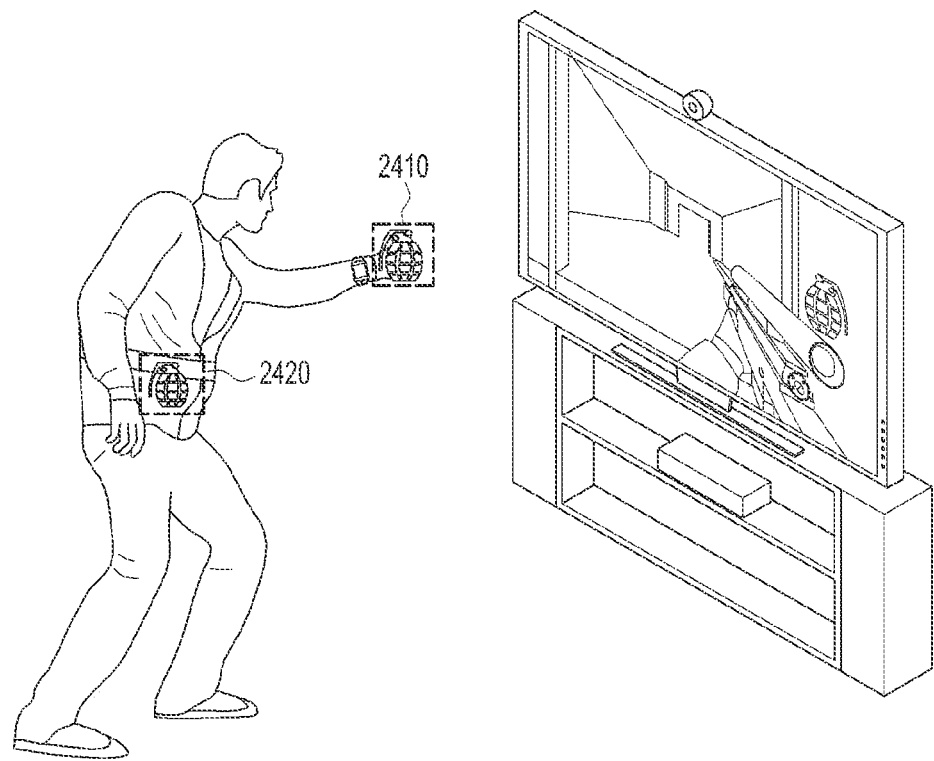
FIG. 24 illustrates a method for determining an ROI according to an embodiment of the present invention.

FIG. 24 illustrates a method for determining an ROI according to an embodiment of the present invention.

In the embodiment shown in FIG. 24, the ROI-determining apparatus 100 expands a region related to an ROI to an additional region of interest. For example, as shown in FIG. 24, the ROI-determining apparatus 100 determines a first ROI 2410 based on an obtained wearing portion. The user performs the operation of bringing his hand close to his stomach a plurality of number of times. The ROI-determining apparatus 100 additionally determines, as a second ROI 2420, a region corresponding to the stomach that stops after the first ROI 2410 has moved.

Figure 25:
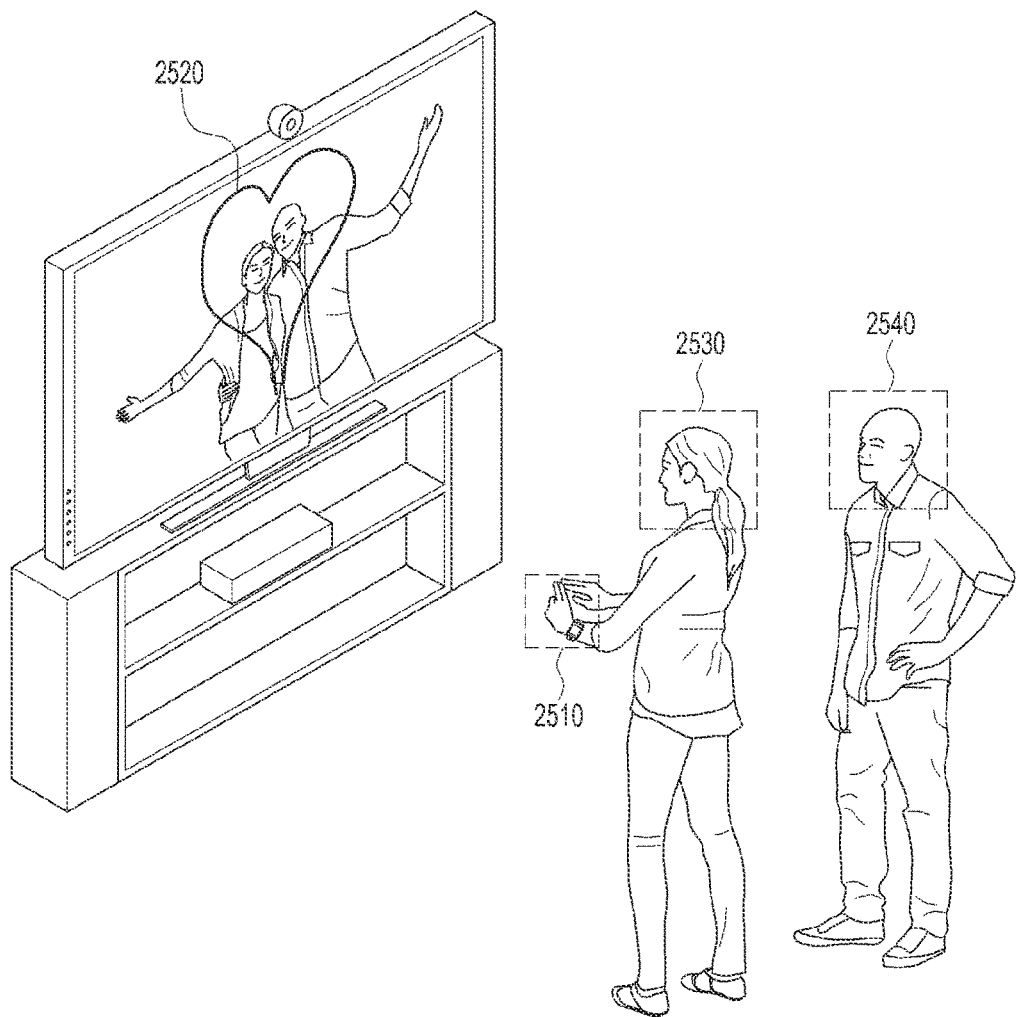
FIG. 25 illustrates a method for determining an ROI according to an embodiment of the present invention.

FIG. 25 illustrates a method for determining an ROI according to an embodiment of the present invention.

In the embodiment shown in FIG. 25, the ROI-determining apparatus 100 may set an additional region of interest based on first information from the first electronic device 200. For example, the first electronic device 200 transmits the user's ECG information to the ROI-determining apparatus 100.

The ROI-determining apparatus 100 determines a first ROI 2510 based on a wearing position of the first electronic device 200. The ROI-determining apparatus 100 determines the user's emotional condition by analyzing the ECG information from the first electronic device 200. The ROI-determining apparatus 100 determines, as an additional second ROI 2520 and third ROI 2530, regions corresponding to the user's face in order to identify the determined emotional condition and to more accurately determine an emotional condition.

Figure 26:
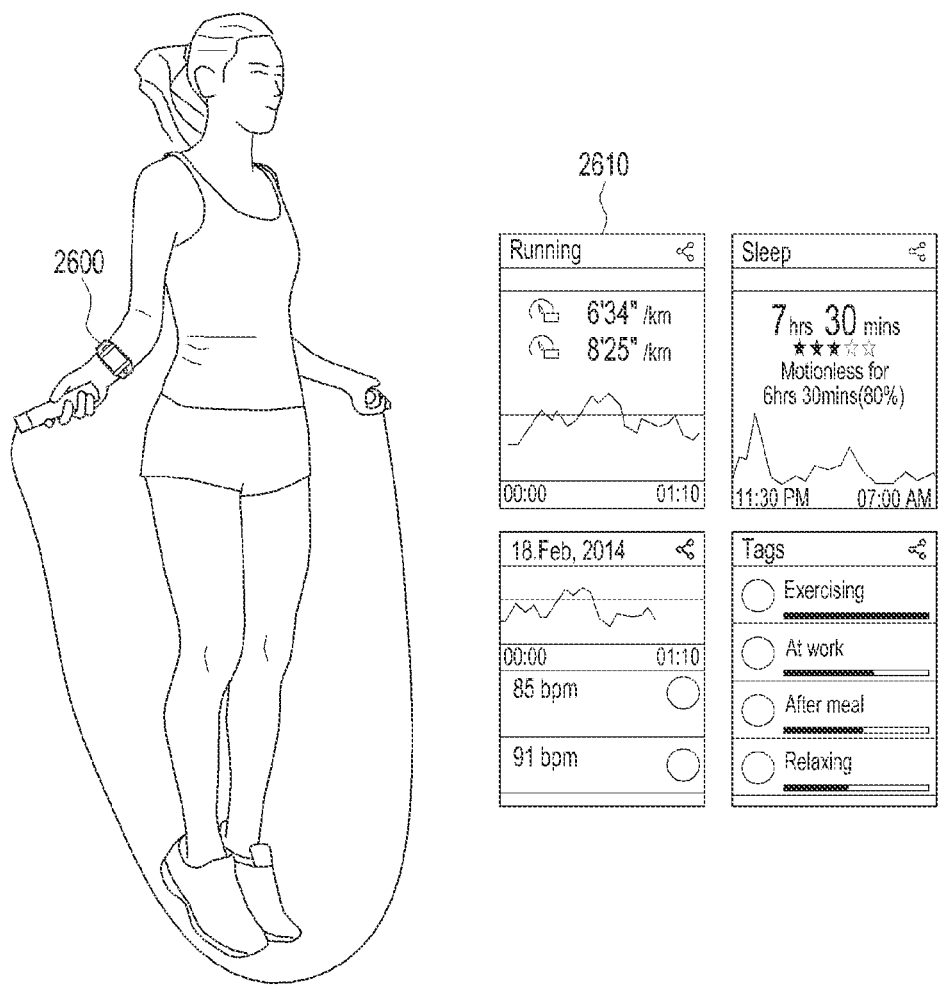
FIG. 26 illustrates a method for determining an ROI according to an embodiment of the present invention.

FIG. 26 illustrates a method for determining an ROI according to an embodiment of the present invention.

In the embodiment shown in FIG. 26, the ROI-determining apparatus 100 obtains third information based on a result of image-processing on an ROI and first information from a first electronic device 2600. For example, the ROI-determining apparatus 100 determines an ROI based on a wearing portion of the first electronic device 2600 and perform image-processing on the determined ROI to obtain second information. For example, it may be difficult to measure the number of rope jumps only with image-processing. Accordingly, the ROI-determining apparatus 100 obtains the third information considering the first information, such as the number of rotations of the first electronic device 2600 in addition to a result of image-processing on the ROI.

The first electronic device 2600 additionally transmits, to the ROI-determining apparatus 100, first information, such as obtained calorie consumption information and heart rate information, as well as the rotation information. The ROI-determining apparatus 100 obtains the third information based on the first information and the second information. For example, the ROI-determining apparatus 100 obtains and collectively outputs a workout schedule, a user's body condition, and workout activity information. For example, the ROI-determining apparatus 100 obtains the third information, such as the number of rope jumps per month, and transfers the third information to the first electronic device 2600. The first electronic device 2600 displays information such as "continue" or "stop jumping rope", based on the received third information.

Figure 27:
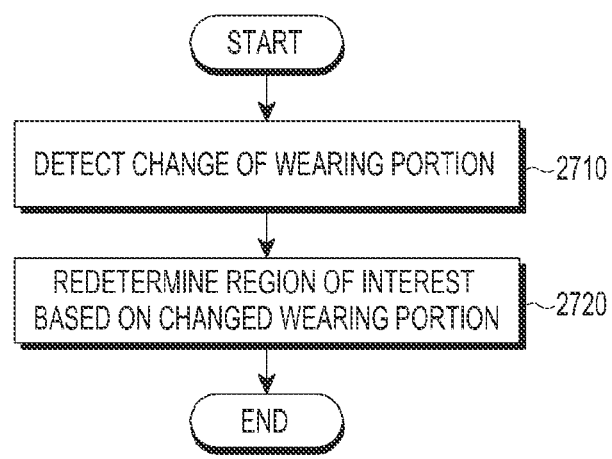
FIG. 27 is a flowchart illustrating a method for re-determining an ROI according to an embodiment of the present invention.
Figure 28A:
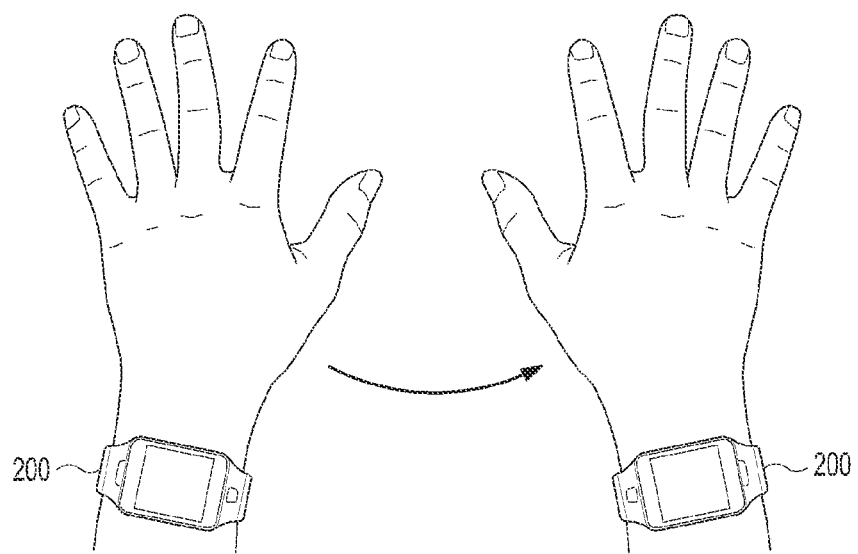
FIGS. 28A and 28B illustrate an example of wearing a first electronic device and an image according to an embodiment of the present invention.
Figure 28B:
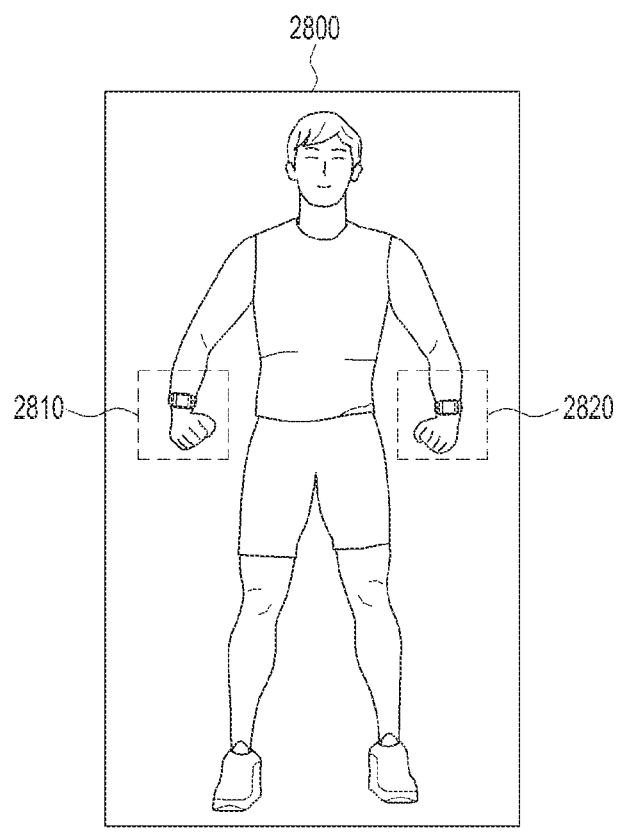

FIG. 27 is a flowchart illustrating a method for re-determining an ROI according to an embodiment of the present invention, and will be described in conjunction with FIGS. 28A and 28B, which illustrate an example of wearing a first electronic device and an image according to embodiments of the present invention.

In step 2710, the ROI-determining apparatus 100 detects a change of a wearing portion of the first electronic device 200. For example, as shown in FIG. 28A, the wearing portion of the first electronic device 200 is changed from the user's left wrist to his right wrist. As pre-stored association information on the first electronic device and wearing portion is updated, the ROI-determining apparatus 100 detects a change of the wearing portion of the first electronic device 200. Alternatively, the ROI-determining apparatus 100 detects a change of the wearing portion through obtained sensed data.

In step 2720, the ROI-determining apparatus 100 may re-determine an ROI based on the changed wearing portion.

For example, the ROI-determining apparatus 100 changes a first ROI 2810 to a second ROI 2820 based on the changed wearing portion.

According to an embodiment of the present invention, a method for determining an ROI includes obtaining a wearing portion of a first electronic device, obtaining a first image related to a user wearing the first electronic device, and determining an ROI from the first image based on the obtained wearing portion.

According to an embodiment of the present invention, obtaining the wearing portion includes determining the first electronic device and the wearing portion based on association information on the wearing portion corresponding to the first electronic device.

According to an embodiment of the present invention, obtaining the wearing portion includes receiving information on the determined wearing portion from the first electronic device or determining the wearing portion based on sensed data received from the first electronic device.

According to an embodiment of the present invention, determining the ROI includes detecting at least one region corresponding to the wearing portion from the first image and determining the ROI corresponding to the detected at least one region.

According to an embodiment of the present invention, the ROI-determining method further includes obtaining motion information on the first electronic device.

According to an embodiment of the present invention, the ROI is determined corresponding to the first electronic device when the first electronic device moves departing from a pre-determined threshold.

According to an embodiment of the present invention, the ROI is determined based on the obtained motion information and wearing portion.

According to an embodiment of the present invention, the ROI-determining method further includes obtaining first information detected by the first electronic device.

According to an embodiment of the present invention, the ROI is determined based on the wearing portion and the type of the first information.

According to an embodiment of the present invention, the ROI-determining method further includes obtaining second information by processing the ROI, and obtaining third information based on the first information and the second information.

According to an embodiment of the present invention, the ROI-determining method further includes executing a first application using a result of processing the ROI. The ROI is determined based on the type of the first application and the wearing portion.

According to an embodiment of the present invention, the ROI-determining method further includes detecting a wearing portion of the first electronic device and re-determining an ROI based on the changed wearing portion.

According to an embodiment of the present invention, the ROI-determining method further includes detecting another region in the image related to the region of interest and additionally including the detected region as another ROI.

According to an embodiment of the present invention, an ROI-determining apparatus includes an image-obtaining module that obtains a first image related to a user wearing a first electronic device, and a processing module that obtains a wearing portion of the first electronic device and determines an ROI from the first image based on the obtained wearing portion.

According to an embodiment of the present invention, the processing module determines the wearing portion based on the first electronic device and association information of a wearing portion corresponding to the first electronic device.

According to an embodiment of the present invention, the ROI-determining apparatus further includes a communication module that receives at least one of information on the wearing portion determined by the first electronic device or sensed data, and determines the wearing portion based on the received information on the wearing portion or the received sensed data.

According to an embodiment of the present invention, the processing module detects at least one region corresponding to the wearing portion from the first image and determines the ROI corresponding to the detected at least one region.

According to an embodiment of the present invention, the processing module obtains motion information on the first electronic device.

According to an embodiment of the present invention, the processing module determines an ROI corresponding to the first electronic device when the first electronic device moves outside of a pre-determined threshold.

According to an embodiment of the present invention, the processing module determines the ROI based on the obtained motion information and wearing portion.

According to an embodiment of the present invention, the processing module obtains first information detected by the first electronic device.

According to an embodiment of the present invention, the processing module determines the ROI based on the wearing portion and the type of the first information.

According to an embodiment of the present invention, the processing module obtains second information by processing the ROI and obtains third information based on the first information and the second information.

According to an embodiment of the present invention, the processing module executes a first application using a result of processing the ROI and determines the ROI based on the type of the first application and the wearing portion.

According to an embodiment of the present invention, the processing module detects a wearing portion of the first electronic device and redetermines an ROI based on the changed wearing portion.

According to an embodiment of the present invention, the processing module detects another region in the image related to the ROI and additionally includes the detected region as another ROI.

According to an embodiment of the present invention, a ROI-determining method includes obtaining a first image related to a user wearing at least one electronic device, obtaining a wearing portion of each of the at least one electronic device, and determining an ROI of the first image using a wearing portion of a first electronic device from which a motion has been detected among the at least one electronic device.

According to an embodiment of the present invention, a ROI-determining method includes executing a first application using a result of image-processing, obtaining a first image related to a user, and determining an ROI from the first image based on the a of the first application.

According to an embodiment of the present invention, a ROI-determining method includes obtaining sensed data from a first electronic device, obtaining an image for a user wearing the first electronic device, and determining an ROI from the image based on the obtained sensed data.

Each of the aforementioned components of the electronic device may include one or more parts, and a name of the part may vary with a type of the electronic device. The electronic device in accordance with various embodiments of the present invention may include at least one of the aforementioned components, omit some, or include other additional component(s). Some of the components may be combined into an entity, but the entity performs the same functions as performed by the components.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which are known or will be developed in the future.

At least a part of the device or method (may be implemented as instructions stored in a computer-readable storage medium e.g., in the form of a programming module. The computer-readable storage medium may be e.g., the memory 130.

The computer-readable storage medium may include a hardware device, such as hard discs, floppy discs, and magnetic tapes, optical media such as Compact Disc Read-Only Memories (ROMs) (CD-ROMs) and DVDs, magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out embodiments of the present invention, and vice-versa.

Modules or programming modules in accordance with various embodiments of the present invention may include at least one or more of the aforementioned components, omit some of them, or further include other additional components. Operations performed by modules, programming modules or other components in accordance with various embodiments of the present invention may be performed sequentially, simultaneously, repeatedly, or heuristically. Furthermore, some of the operations may be performed in a different order, may be omitted, or may include other additional operation(s).

According to an embodiment of the present invention, a storage medium may store commands that are configured to enable at least one processor to perform at least one operation when the commands are executed by the at least one processor. The at least one operation includes obtaining a wearing portion of a first electronic device, obtaining a first image related to a user wearing the first electronic device, and determining an ROI from the first image based on the obtained wearing portion.

The embodiments disclosed herein are disclosed for description and understanding of the disclosed technology and do not limit the scope of the present invention. Accordingly, the scope of the present invention should be interpreted as including all changes or various embodiments based on the technical spirit of the present invention.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. An operation method of an electronic device, comprising:
   receiving, by a communication device of the electronic device, identification information of a first electronic device, through a communication with the first electronic device;
   determining, by a processor of the electronic device, a wearing portion of a body of a user corresponding to the first electronic device based on the identification information of the first electronic device;
   obtaining, by a camera of the electronic device, a first image related to the user wearing the first electronic device;
   determining, by the processor of the electronic device, a portion of the first image to be processed from the first image based on the determined wearing portion, the portion of the first image including an object corresponding to at least part of the determined wearing portion of the body of the user;
   performing, by the processor of the electronic device, image processing on the determined portion of the first image and identifying a movement of the determined wearing portion of the body of the user based on a result of the image processing; and
   performing, by the processor of the electronic device, an event based on the movement of the determined wearing portion of the body of the user.

2. The method of claim 1, wherein the wearing portion is determined based on the first electronic device and association information on a wearing portion corresponding to the first electronic device.

3. The method of claim 1, wherein determining the portion of the first image to be processed includes:
   detecting, by the processor of the electronic device, at least one region corresponding to the wearing portion from the first image; and
   determining, by the processor of the electronic device, the portion of the first image to be processed corresponding to the detected at least one region.

4. The method of claim 1, further comprising obtaining, by the communication device of the electronic device, motion information on the first electronic device.

5. The method of claim 4, wherein the portion of the first image to be processed corresponding to the first electronic device is determined when the first electronic device moves outside a pre-determined threshold.

6. The method of claim 4, wherein the portion of the first image to be processed is determined based on the obtained motion information and the wearing portion.

7. The method of claim 1, further comprising obtaining, by the communication device of the electronic device, first information detected by the first electronic device.

8. The method of claim 7, wherein the portion of the first image to be processed is determined based on the wearing portion and a type of the first information.

9. The method of claim 7, further comprising:
   obtaining, by the processor of the electronic device, second information by processing the portion of the first image to be processed; and
   obtaining, by the processor of the electronic device, third information based on the first information and the second information.

10. The method of claim 1, further comprising executing, by the processor of the electronic device, a first application using a result of processing the portion of the first image to be processed, wherein the portion of the first image to be processed is determined based on the wearing portion and data from the first application.

11. The method of claim 1, further comprising:
    detecting, by the processor of the electronic device, a change of the wearing portion of the first electronic device; and
    re-determining, by the processor of the electronic device, the portion of the first image to be processed based on the changed wearing portion.

12. The method of claim 1, further comprising:
    detecting, by the processor of the electronic device, another region in the first image that is related to the portion of the first image to be processed; and
    additionally including, by the processor of the electronic device, the another detected region as another portion of the first image to be processed.

13. An apparatus comprising:
    a communication device;
    a camera; and
    a processor configured to:
    receive identification information of a first electronic device, through the communication device,
    determine a wearing portion of a body of a user corresponding to the first electronic device based on the identification information of the first electronic device,
    control the camera to obtain a first image related to the user wearing the first electronic device,
    determine a portion of the first image to be processed from the first image based on the determined wearing portion,
    perform image processing on the determined portion of the first image and identify a movement of the determined wearing portion of the body of the user based on a result of the image processing, and
    perform an event based on the movement of the determined wearing portion of the body of the user,
    wherein the portion of the first image includes an object corresponding to at least part of the determined wearing portion of the body of the user.

14. The apparatus of claim 13, wherein the processor is configured to determine the wearing portion based on the first electronic device and association information of a wearing portion corresponding to the first electronic device.

15. The apparatus of claim 13, wherein the processor is configured to detect at least one region corresponding to the wearing portion from the first image and determine the portion of the first image to be processed corresponding to the detected at least one region.

16. The apparatus of claim 13, wherein the processor is configured to obtain motion information on the first electronic device.

17. The apparatus of claim 16, wherein the processor is configured to determine the portion of the first image to be processed corresponding to the first electronic device when the first electronic device moves outside a pre-determined threshold.

18. An operation method of an electronic device, the method comprising:
    receiving, by a communication device of the electronic device, identification information of at least one electronic device, through a communication with the at least one electronic device;

obtaining, by a camera of the electronic device, a first image related to a user wearing the at least one electronic device;

determining, by the processor of the electronic device, each wearing portion of a body of the user wearing the at least one electronic device based on the identification information;

determining, by the processor of the electronic device, a portion of the first image to be processed from the first image using a wearing portion of a first electronic device from which a motion is detected among the at least one electronic device, the portion of the first image including an object corresponding to at least part of the determined wearing portion of the body of the user;

performing, by the processor of the electronic device, image processing on the determined portion of the first image and identifying a movement of the determined wearing portion of the body of the user based on a result of the image processing; and performing, by the processor of the electronic device, an event based on the movement of the determined wearing portion of the body of the user.

* * * * *